(12) United States Patent
Mayer

(10) Patent No.: US 7,413,070 B2
(45) Date of Patent: Aug. 19, 2008

(54) POSITIONING SYSTEM

(75) Inventor: Josef Mayer, Memmingerberg (DE)

(73) Assignee: CFS GmbH Kemptem, Kemptem (DE)

( * ) Notice: Subject to any disclaimer, the term of this patent is extended or adjusted under 35 U.S.C. 154(b) by 371 days.

(21) Appl. No.: 10/501,413

(22) PCT Filed: Jan. 10, 2003

(86) PCT No.: PCT/EP03/00179

§ 371 (c)(1),
(2), (4) Date: Jul. 22, 2005

(87) PCT Pub. No.: WO03/057602

PCT Pub. Date: Jul. 17, 2003

(65) Prior Publication Data

US 2006/0131131 A1    Jun. 22, 2006

(30) Foreign Application Priority Data

Jan. 14, 2002   (DE) ............................... 102 01 182

(51) Int. Cl.
*B65G 47/71* (2006.01)

(52) U.S. Cl. ................ 198/431; 198/588; 198/594; 198/812

(58) Field of Classification Search ............... 198/415, 198/418.6, 431, 436, 437, 457.01, 460.2, 198/535, 588, 594, 812
See application file for complete search history.

(56) References Cited

U.S. PATENT DOCUMENTS

| | | | | |
|---|---|---|---|---|
| 3,106,280 A | * | 10/1963 | Baker | 198/431 |
| 3,324,987 A | * | 6/1967 | Keisser | 198/434 |
| 4,684,008 A | 8/1987 | Hayashi et al. | | 198/436 |
| 5,088,912 A | * | 2/1992 | Raque et al. | 425/155 |
| 5,383,760 A | * | 1/1995 | Cawley et al. | 414/791.6 |
| 6,056,109 A | * | 5/2000 | Hidai et al. | 198/431 |
| 6,253,904 B1 | * | 7/2001 | Soldavini | 198/431 |
| 6,669,005 B2 | * | 12/2003 | Sandberg et al. | 198/460.2 |
| 6,691,858 B2 | * | 2/2004 | Weber | 198/456 |
| 7,021,450 B2 | * | 4/2006 | Jones, Jr. | 198/462.1 |

FOREIGN PATENT DOCUMENTS

| | | |
|---|---|---|
| DE | 1 566 704 | 9/1973 |
| DE | 25 16 583 | 10/1976 |

(Continued)

OTHER PUBLICATIONS

Kleenline Web Site, Product Guide, http://www.kleenline.com, Mar. 5, 2007, 1 Page.

(Continued)

*Primary Examiner*—Douglas A Hess
(74) *Attorney, Agent, or Firm*—Dobrusin & Thennisch PC

(57) ABSTRACT

The invention relates to a device for forming any desired portions and sizes of products, comprising an aligning belt (1) that conveys the products (2) while transferring them, at a transfer edge (4), to a portioning belt (3), on which the portions (6) and/or sizes (5) are formed and with which the portions are conveyed onward in their corresponding sizes. The invention relates to a system comprised of the inventive device and of a packing machine (16), and to a method for producing any desired portions and sizes of products.

28 Claims, 19 Drawing Sheets

FOREIGN PATENT DOCUMENTS

| | | |
|---|---|---|
| DE | 22 00 311 | 10/1983 |
| DE | 33 38 068 | 6/1984 |
| DE | 38 33 390 | 5/1989 |
| DE | 42 43 689 | 6/1994 |
| DE | 195 16 807 | 11/1996 |
| DE | 197 52 908 | 6/1999 |
| EP | 0104142 A2 | 3/1982 |
| EP | 0 104 142 | 8/1983 |
| EP | 0 186 986 | 12/1985 |
| EP | 0 461 070 | 5/1991 |
| EP | 1 798 242 | 10/1997 |
| EP | 0798242 A2 | 10/1997 |
| WO | 98/23510 | 6/1998 |

OTHER PUBLICATIONS

Kleenline Web Site, http://www.kleenline.com. Mar. 5, 2007, 2 Pages.

Kleenline Web Site, High Speed Rack and Pinioin Shuttle Conveyor, www.kleenline.com/lit/shuttle.pdf, 1 Page.

Kleenline Web Site, Total Project Execution, www.kleenline.com/litlKLEENLine_bro.pdf, 10 Pages.

\* cited by examiner

POSITIONING SYSTEM

This application is the National Stage of International Application No. PCT/EP03/00179, International Filing Date, Jan. 10, 2003, which designated the United States of America, and which international application was published under PCT Article 21(2) as WO Publication No. WO 03/057602 A1 and which claims priority from German Application No. DE 102 01 182.6, filed Jan. 14, 2002.

BACKGROUND OF THE INVENTION

1. Field of the Invention

The present invention relates to a device for producing any desired portions and formats of products, comprising an aligning belt which conveys the products and at a transfer edge transfers them to a portioning belt on which the portions and/or the formats are produced and with which the portions are conveyed onwards in the corresponding formats. The present invention also relates to a system comprising the device according to the invention and a packaging machine and to a method for producing any desired portions and formats of products.

2. Brief Description of Related Developments

Positioning systems for positioning products, for example foodstuffs, other goods and the like, are known. Here the products are transferred by a conveyor belt, for example, to a packaging line. As these packaging systems are nowadays constructed in multiple rows, an incoming product stream has to initially be divided into the number of product streams corresponding to the number of product rows in the packaging line. Distribution of a single-row product stream among a multi-row packaging line is currently only possible when the number of conveyor belts with incoming products is arranged parallel above the respective row of the packaging line, by means of which the individual products or product stacks are then placed in the respective row of the packaging line or are ejected from the conveyor belt.

The plant engineering for this is very complex. In addition, the depositing sequence for the individual stacks cannot be varied, or can only be varied with considerable expenditure. Complex machinery is required for a change of format in the packaging machine, for example from three rows to four rows, before the products can be positioned in a packaging line.

Therefore, the object is to provide a device for producing any desired portions and formats, which does not have the drawbacks of the prior art.

The object is achieved according to the invention by the features of claim 1. The sub-claims relate to preferred embodiments of the present invention.

A portion according to the invention is any arrangement in which products, in particular foodstuffs, are arranged in a specific portion pattern. The stack, the shingling in the longitudinal and transverse directions, in each case with and without overlapping, the zigzag pattern and the terrace-like row are mentioned here as non-limiting examples of possible portion patterns.

A format according to the invention is the arrangement which the individual portions assume with respect to one another. The format of the portions is generally based on the arrangement of the packaging cavities of a subsequent packaging machine in which the portions are deposited and/or the clock rate at which the packaging cavities are conveyed onwards. The products are preferably deposited in parallel product rows.

SUMMARY OF THE INVENTION

According to the invention, a device for producing any desired portions and formats is provided, which consists of an aligning belt and a portioning belt. The products are conveyed by the aligning belt and transferred at a transfer edge to the portioning belt. The respectively desired portions or formats are produced on the portioning belt. Also, according to the invention, the position of the transfer edge can be changed in at least one direction and relative to the portioning belt and/or the position of the portioning belt can be changed in at least one direction and relative to the transfer edge, the position of the transfer edge and the movement of the portioning belt being coordinated with one another such that any desired portions and format can be produced with the products. It is accordingly possible using the device according to the invention, to produce any desired portions in any desired formats from a single-row conveying stream.

Any conveying device familiar to a person skilled in the art is suitable as the aligning belt. However, the aligning belt is preferably an endless conveyor belt. The change in the position of the transfer edge of the aligning belt can be produced in that the entire aligning belt is displaceably mounted relative to the portioning belt and/or in that the length of the aligning belt can be changed, for example by construction as a return belt or shuttle belt. The device according to the invention can comprise a plurality of aligning belts which preferably operate independently of one another. This embodiment is even more flexible than a device according to the invention with only one aligning belt.

If the position of the transfer edge relative to the portioning belt can be changed, the movement of the transfer edge should preferably be configured in such a way that the transfer edge travels so far over the width or length of the portioning belt that, by taking into account their throw parabola, the products can be deposited at any position along the portioning belt. The speed at which the position of the transfer edge is changed is preferably greater than the conveying speed of the aligning belt.

Any devices familiar to a person skilled in the art on which the products can be deposited in predetermined portions and in a specific format and can preferably be conveyed onwards is suitable as the portioning belt. The portioning belt can then convey the products arriving in a single row from the aligning belt in multiple rows and in the desired portion pattern onwards, for example, to a packaging machine. The portioning belt is preferably an endless belt which is preferably arranged in a machine frame. The change in the position of the portioning belt can be produced in that the entire machine frame is moved relative to the transfer edge and/or in that the portioning belt is moved relative to the machine frame. The device according to the invention can comprise a plurality of portioning belts which preferably operate independently of one another.

If the portioning belt is movable relative to the transfer edge, the movement of the portioning belt should preferably be configured in such a way that, by taking into account their throw parabola, the products can be deposited at any position along the aligning belt. The speed at which the portioning belt is moved should preferably be greater than the conveying speed of the aligning belt.

The aligning belt and the portioning belt can the arranged at any desired angle to one another. However, an arrangement at a right angle is preferred.

In a preferred embodiment of invention the position of the transfer edge can be changed in and counter to the conveying direction of the aligning belt and the portioning belt is movable relative to the transfer edge in one direction. The two directions are preferably located in one plane and can adopt any desired angle to one another, the angle between the conveying direction and the direction of movement of the portioning belt preferably being 90° or 270°.

In a further preferred embodiment of the present invention the position of the transfer edge in the conveying direction and transversely to the conveying direction of the aligning belt can be changed as desired. The portioning belt is preferably not moved for producing the portions or formats.

In a further preferred embodiment of the present invention the portioning belt is constructed to be movable at least in two directions which are preferably perpendicular to one another. The transfer edge of the aligning belt is preferably not moved for producing the portions or formats.

In a further preferred embodiment of the present invention the position of the transfer edge can be changed in and counter to the conveying direction of the aligning belt and comprises a means with which the products can be lined up on the aligning belt relative to the central track thereof. The portioning belt is preferably not moved for producing the portions or formats.

The device preferably comprises a plurality of aligning and/or portioning belts, the conveying direction of which can be the same or opposed in each case.

The transfer edge is preferably displaceably mounted on the aligning belt, preferably in a guide, the displacement preferably taking place via a servomotor. In this case, the belt length has to be compensated in the aligning belt. This embodiment of the present invention has the advantage that the exact position of the end of the aligning belt can be ascertained electronically at any time. It allows continuous positioning of the products to be deposited on the positioning belt. A displaceably mounted transfer edge also has the advantage that the products can be transferred from the aligning belt to the portioning belt by a fast return stroke, preferably at a constant conveying speed of the aligning belt. This embodiment of the present invention reduces the tilting effect of the products during the parabolic trajectory thereof.

The portioning belt is preferably also a loading belt. In this case, one or more formats are produced on the portioning belt, conveyed, for example, to a packaging machine and then placed in packagings by the portioning belt. It is advantageous in particular when the portioning belt is also used as a loading belt if one end thereof is displaceably mounted, so the portioning belt can be lengthened and shortened. The portioning belt is particularly preferably configured as what is known as a return or shuttle belt, so the products can be deposited in the packaging cavities with a fast return stroke of the portioning belt. Said end is quite particularly preferably displaced by a servomotor, the belt being stationary during the return. This embodiment of the present invention has the advantage that its positioning is very exact and that the exact position of the end of the portioning belt can be electronically ascertained at any time.

The aligning belt and/or the portioning belt is also preferably driven in each case by a servomotor, so the movements of the belts can be controlled very precisely and can be transmitted by a sensor to central control unit.

In a preferred embodiment the device according to the invention comprises a detection means, preferably a photocell. This detection means is preferably arranged in the region of the beginning of the aligning belt and detects the position of the products on the aligning belt, at least in the conveying direction. In this case, the products must be arranged substantially aligned with one another on the aligning belt, so exact portions and format can be produced. If the detection means also ascertains the position of the products relative to the central track of the aligning belt, this information can be taken into account when controlling the position of the transfer edge and/or the movement of the portioning belt in order to improve the quality of the portions or formats.

The signals of the detection means are preferably transmitted to a computer, for example a memory programmable controller (SPS), which is in turn connected to the drives, for example the servomotors. The exact location of the respective product within the device can be calculated with the aid of the data transmitted by the detection means and the drives. The drives of the device according to the invention are also controlled by the computer. This embodiment of the present invention has the advantage that any portion patterns and format can be freely programmed and stored and that the portion patterns and/or format can be changed without a constructional change to the device according to the invention having to be carried out. An amount for the clock rate of the movement of the portioning belt is preferably stored in the controller. It is also advantageous if the controller transmits a signal to the drive of the portioning belt only when all rows of the portioning belt are occupied by products. This ensures that all rows to be supplied, for example to a subsequent packaging machine, are occupied by products.

The conveying speed of the aligning belt is preferably constant. This embodiment of the present invention has the advantage that no product buffer has to be arranged upstream of the aligning belt.

The device according to the invention is simple and inexpensive to produce and operate. Any desired portions and formats may be produced using the device according to the invention. The portion patterns and/or formats are freely programmable and can be changed as desired by pushing a button without the device according to the invention having to be modified. The device according to the invention can be operated with a detection means. The position of the product on the aligning belt only has to be detected once. The exact path and the speed of the respective product within the device can be determined with the aid of the signals of the detection means and the signals of the drive sensors. The products do not have to be transferred to the aligning belt with specific spacing, so a buffer does not need to be arranged upstream of the device according to the invention. Irregular product spacing on the aligning belt can be compensated. The speed of the aligning belt can itself be kept constant on transfer of products from the aligning belt to the portioning belt, so a product buffer can be dispensed with. If the subsequent machine, for example a packaging machine, stops, the device according to the invention is also stopped without the products located thereon having to be removed. Restarting then takes place automatically as the device knows the position of the respective products on the aligning and portioning belt as knowledge of path and speed. When using the device according to the invention as a loading belt, the spacing between the intake central track of the aligning belt and the loading center line, for example of the packaging machine, can be freely selected within the machine limits.

The device according to the invention can also be used to place the portioned products in packagings.

The present invention therefore also relates to a system consisting of a device according to the invention and a packaging machine, the portioning belt in this case also being a loading belt which places the products into packaging cavities which are conveyed along the packaging machine, preferably in a clocked manner.

The portioning/loading belt is preferably arranged at a right angle to the packaging machine and the aligning belt is particularly preferably arranged at a right angle to the portioning/loading belt. In the process, the aligning belt conveys the products arriving in rows to the portioning belt and positions them according to the predetermined portion pattern or format. A person skilled in the art understands that the products can already be on the aligning belt in the desired portion pattern and only have to be arranged in the corresponding format on the portioning belt. The portioning belt then in turn conveys the portions thus positioned to the packaging machine and deposits them in the trays provided for them in the loading station. The two conveyor belts are in principle identical in construction, they basically differ only in their width. However, it is also possible for the two conveyor belts to have the same width. It is advantageous if a plurality of positioning belts are provided or one positioning belt is divided into multiple rows and the belt ends of the portioning belts are movable in the conveying direction of the conveyor belt. A servomotor for driving the conveyor belt and a further servomotor for driving the movement of the belt end are preferably located in the aligning belt and in the positioning belt. The movement of the belt end is a reciprocating movement.

The device is preferably coordinated with the clock rate of the packaging machine. A signal for clocking the positioning belt is preferably given when all rows of the loading station are occupied. The device according to the invention and the packaging machine can be controlled by a common computer.

The system according to the invention is simple and inexpensive to set up. The device according to the invention can be combined with any other packaging machine. Any desired portions may be loaded into packaging cavities which are arranged in any desired format with respect to one another, using the system according to the invention. The portion patterns and/or the formats are freely programmable and can be changed as desired by pressing a button, so the system according to the invention does not have to be modified for a change in format within the packaging machine, on a change of product or a change in the portion pattern. The system according to the invention can be operated with a detection means. The position of the product on the aligning belt only has to be detected once. The exact path and the speed of the respective product within the device can be determined with the aid of the signals of the detection means and the signals of the drive sensors. The products do not have to be transferred to the aligning belt with specific spacing, so a buffer does not need to be arranged upstream of the system according to the invention. Irregular product spacing on the aligning belt can be compensated. The speed of the aligning belt can itself be kept constant during the transfer of the products from the aligning belt to the portioning belt, so a product buffer can be dispensed with. If the subsequent packaging machine stops, the aligning belt and the portioning/loading belt are also stopped without the products located thereon having to be removed. Restarting of the aligning belt and of the portioning/loading belt takes place automatically once the packaging machine is operative again as the device knows the position of the respective products on the aligning or portioning belt as knowledge of the path and speed. The spacing between the middle intake track of the aligning belt and of the loading center line of the packaging machine can be freely selected within the machine limits.

The present invention also relates to a method for producing any desired portions and formats of products, comprising an aligning belt which conveys the products and transfers them at a transfer edge to a portioning belt on which the portions and/or the formats are produced and with which the products are preferably conveyed onwards as corresponding portions and in the respective format, wherein the position of the transfer edge relative to the portioning belt is changed, at least in one direction, and/or the position of the portioning belt is moved relative to the transfer edge, at least in one direction, and the position of the transfer edge and the movement of the portioning belt are coordinated with one another such that any desired portions and formats are produced with the products.

A portion according to the invention is any arrangement in which products, in particular foodstuffs, are arranged in a specific portion pattern. The stack, the shingling in the longitudinal and transverse directions, in each case with and without overlapping, the zigzag pattern and the terrace-like row are mentioned here as non-limiting examples of possible portion patterns.

A format according to the invention is the arrangement which the individual portions assume with respect to one another. The format of the portions is generally based on the arrangement of the packaging cavities of a subsequent packaging machine in which the portions are deposited and/or the clock rate at which the packaging cavities are conveyed onwards. The products are preferably deposited in parallel product rows.

Any conveying device familiar to a person skilled in the art is suitable as the aligning belt. However, the aligning belt is preferably an endless conveyor belt. The change in the position of the transfer edge of the aligning belt can be produced in that the entire aligning belt is displaceably mounted, preferably in a guide, relative to the portioning belt and/or in that the length of the aligning belt can be changed, for example by construction as a return belt or shuttle belt. The device can comprise a plurality of aligning belts which preferably operate independently of one another.

If the position of the transfer edge relative to the portioning belt can be changed, the movement of the transfer edge should preferably be configured in such a way that the transfer edge travels so far over the width or length of the portioning belt that, by taking into account their throw parabola, the products can be deposited at any position along the portioning belt. The speed at which the position of the transfer edge is changed is preferably greater than the conveying speed of the aligning belt.

Any devices familiar to a person skilled in the art on which the products can be deposited in predetermined portions and in a specific format and can preferably be conveyed onwards is suitable as the portioning belt. The portioning belt is preferably an endless belt which is preferably arranged in a machine frame. The change in the position of the portioning belt can be produced in that the entire machine frame is moved relative to the transfer edge and/or in that the portioning belt is moved relative to machine frame. The device according to the invention can comprise a plurality of portioning belts which preferably operate independently of one another.

If the portioning belt is movable relative to the transfer edge, the movement of the portioning belt should preferably be configured in such a way that, by taking into account their throw parabola, the products can be deposited at any position along the aligning belt. The speed at which the portioning belt is moved is preferably greater than the conveying speed of the aligning belt.

The aligning belt and the portioning belt can be arranged at any desired angle to one another. However, an arrangement at a right angle is preferred.

In a preferred embodiment of the invention the position of the transfer edge can be changed in and counter to the conveying direction of the aligning belt and the portioning belt is movable relative to the transfer edge in one direction. The two directions are preferably located in one plane and can adopt any desired angle to one another, the angle between the conveying direction and the direction of movement of the portioning belt preferably being 90° or 270°.

In a further preferred embodiment of the present invention the position of the transfer edge can be changed as desired in the conveying direction and transversely to the conveying direction of the aligning belt. The portioning belt is preferably not moved for producing the portions or formats.

In a further preferred embodiment of the present invention the portioning belt is constructed to be movable at least in two directions which are preferably perpendicular to one another. The transfer edge of the aligning belt is preferably not moved for producing the portions or formats.

In a further preferred embodiment of the present invention the position of the transfer edge can be changed in and counter to the conveying direction of the aligning belt and comprises a means with which the products can be lined up on the aligning belt relative to the central track thereof. The portioning belt is preferably not moved for producing the portions or formats.

The transfer edge is preferably displaceably mounted on the aligning belt, displacement preferably taking place via a servomotor. In this case, the belt length has to be compensated in the aligning belt. This embodiment of the present invention has the advantage that the exact position of the end of the aligning belt can be ascertained electronically at any time. It allows continuous positioning of the products to be deposited on the positioning belt. A displaceably mounted transfer edge also has the advantage that the products can be transferred from the aligning belt to the portioning belt by a fast return stroke, preferably at a constant conveying speed of the aligning belt. This embodiment of the present invention reduces the tilting effect of the products during the parabolic trajectory thereof.

The portioning belt is preferably also a loading belt. In this case, one or more formats are produced on the portioning belt, conveyed, for example, to a packaging machine and then placed in packagings by the portioning belt. It is advantageous, in particular when the portioning belt is also used as a loading belt, if one end thereof is displaceably mounted, so the portioning belt can be lengthened and shortened. The portioning belt is particularly preferably configured as what is known as return or shuttle belt, so the products are deposited in the packaging cavities with a fast return stroke of the portioning belt, the belt being stationary during the return. Said end is quite particularly preferably displaced by a servomotor. This embodiment of the present invention has the advantage that its positioning is very exact and that the exact position of the end of the portioning belt can be electronically ascertained at any time.

The aligning belt and/or the portioning belt is also preferably driven in each case by a servomotor, so the movements of the belts can be controlled very precisely and can be transmitted by a sensor to central control unit.

In a preferred embodiment the device comprises a detection means, preferably a photocell. This detection means is preferably arranged in the region of the beginning of the aligning belt and detects the position of the products on the aligning belt, at least in the conveying direction. In this case, the products must be substantially aligned with one another on the aligning belt, so exact portions and formats can be produced. If the detection means also ascertains the position of the products relative to the central track of the aligning belt, this information can be taken into account when controlling the position of the transfer edge and/or the movement of the portioning belt in order to improve the quality of the portions or formats.

The signals of the detection means are preferably transmitted to a computer, for example a memory programmable controller (SPS), which is in turn connected to the drives, for example the servomotors. The exact location of the respective product within the device can be calculated with the aid of the data transmitted by the detection means and the drives. The drives of the device according to the invention are also controlled by the computer. This embodiment of the present invention has the advantage that any portion patterns and format can be freely programmed and stored and that the portion patterns and/or format can be changed without a constructional change to the device according to the invention having to be carried out. An amount for the clock rate of the movement of the portioning belt is preferably stored in the controller. It is also advantageous if the controller transmits a signal to the drive of the portioning belt only when all rows of the portioning belt are occupied by products. This ensures that all rows to be supplied, for example to a subsequent packaging machine, are occupied by products.

The conveying speed of the aligning belt is preferably constant. This embodiment of the present invention has the advantage that no product buffer has to be arranged upstream of the aligning belt.

The method according to the invention is simple and inexpensive to carry out. Any desired portions and formats may be produced using the device according to the invention. The portion patterns and/or formats are freely programmable and can be changed as desired by pushing a button without the device according to the invention having to be modified. The method according to the invention can be operated with a detection means. The position of the product on the aligning belt only has to be detected once. The exact path and the speed of the respective product within the device can be determined with the aid of the signals of the detection means and the signals of the drive sensors. The products do not have to be transferred to the aligning belt with specific spacing, so a product buffer does not need to be provided with the method according to the invention. Irregular product spacing on the aligning belt can be compensated. The speed of the aligning belt can itself be kept constant on transfer of products from the aligning belt to the portioning belt, so a product buffer can be dispensed with. If the subsequent machine, for example a packaging machine, stops, the device according to the invention is also stopped without the products located thereon having to be removed. Restarting then takes place automatically as the position of the respective products on the aligning or portioning belt is known as knowledge of path and speed. When using the device according to the invention as a loading belt, the spacing between the intake central track of the aligning belt and the loading center line, for example of the packaging machine, can be freely selected within the machine limits.

BRIEF DESCRIPTION OF THE DRAWINGS

The invention will be described hereinafter with reference to FIG. 1 to 19. These descriptions are merely exemplary and do not restrict the general inventive concept. The descriptions apply equally to the device according to the invention, the system according to the invention and the method according to the invention.

DETAILED DESCRIPTION OF THE PREFERRED EMBODIMENT(s)

Figure 1:
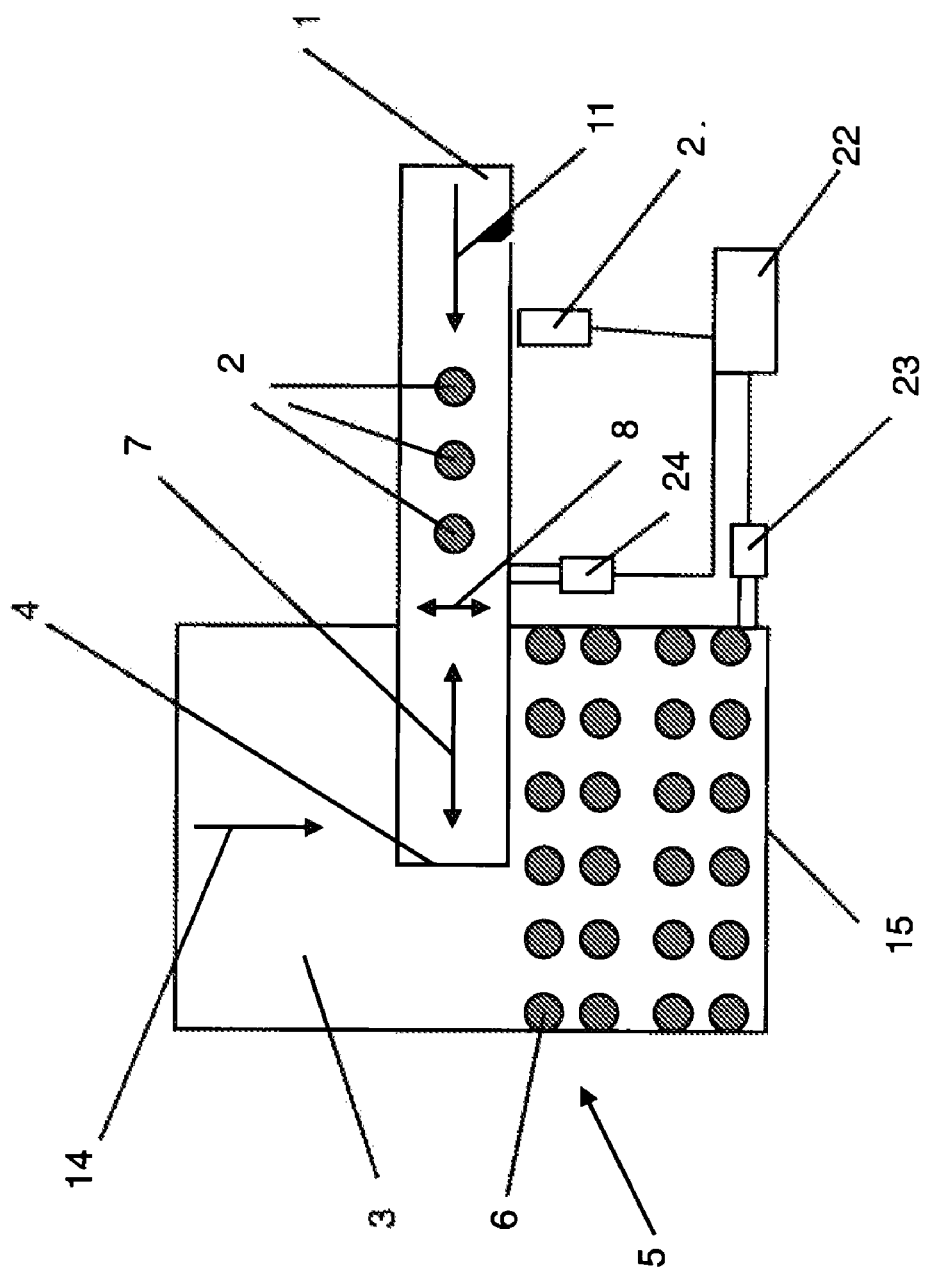
FIG. 1 shows an embodiment of the device according to the invention in which the aligning belt is moved in two directions.
Figure 10:
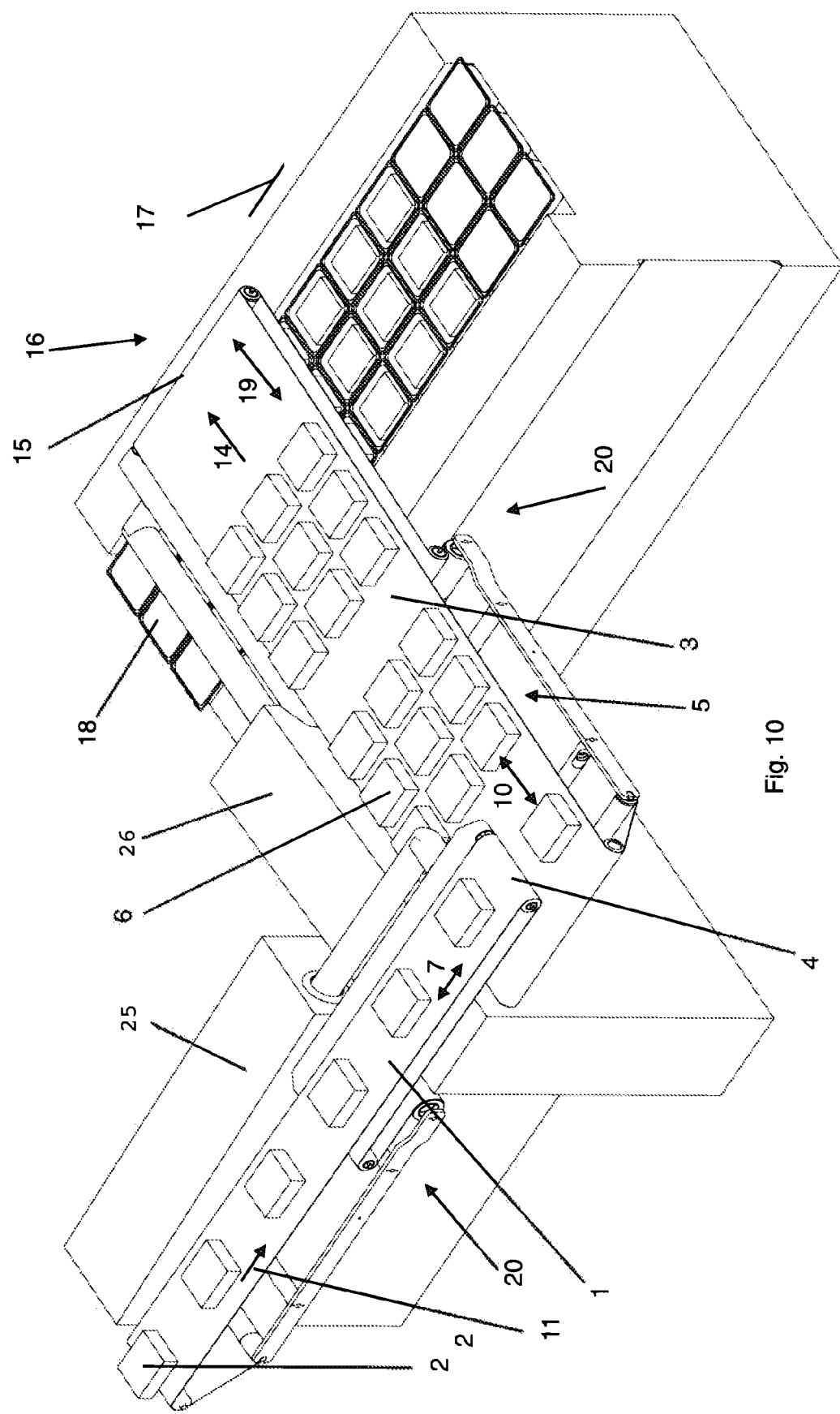
FIG. 10 shows a device according to the invention in which the portioning belt is also a loading belt.

FIG. 1 shows an embodiment of the device according to the invention with an aligning belt 1 and a portioning belt 3. The products 2 (only three are shown) are conveyed by the aligning belt. The conveying device is symbolised by arrow 11. The spacing of the products 2 on the aligning belt 1 does not have to be constant in the conveying direction 11. The aligning belt has a machine frame (not shown) in which a conventional endless belt is arranged. The aligning belt is driven at a constant speed by a servomotor 24. The aligning belt has a transfer edge 4 at which the products 2 are dropped onto the portioning belt 3. In the present embodiment of the present invention, the transfer edge can be moved relative to the portioning belt, both in and counter to the conveying direction 11 as well as transversely to the conveying direction 11 of the aligning belt, and this is symbolized by the double arrows 7 and 8. To change the position of the transfer edge 4 in/counter to the conveying direction 11, the transfer edge 4 is displaceably mounted, relative to the machine frame, in a guide (not shown), whereby the conveyor belt is lengthened or shortened. The transfer edge is driven by a servomotor 25 (FIG. 10). In this embodiment of the present invention the products 2 can be ejected via a fast return stroke, so the tilting effect of the products during the parabolic trajectory is reduced. A person skilled in the art understands that, for this purpose, belt length compensation has to be provided on the aligning belt, so, on the one hand, there is sufficient belt length available but, on the other hand, the belt is always taut. The movement of the transfer edge 4 transversely to the conveying direction 8 is achieved by movement of the entire aligning belt 1 which takes place via a servomotor. A person skilled in the art understands that the movement of the aligning belt in the conveying direction of the products can also be achieved by displacement of the entire aligning belt. As the two movements can be superimposed, any desired points in a plane can be approached. The movement of the transfer edge of the aligning belt 1 is dimensioned such that, by taking into account the throw parabola, the products 2 can be deposited at all desired points of the portioning belt 3. The movement of the transfer edge 4 has to take place so rapidly between two ejections that the transfer edge has reached its new position at least by the time the product to be ejected reaches the transfer edge. The portioning belt 3 is stationary as the products 2 are being deposited in specific portions 6 and formats 5. The portioning belt 3 is, in the present case, also configured as a conveyor belt which conveys the products in a clocked manner in the direction symbolized by the arrow 14, once a format configuration 5, which in the present case consists of six adjacent portions 6 in two rows, has been deposited on the portioning belt. A person skilled in the art understands that this function can also be used for the portion and/or format formation. The portioning belt is driven by a servomotor 23. The device according to the invention comprises a controller 22, which controls the position of the transfer edge in such a way that any desired portion patterns and format can be produced on the portioning belt. The controller also controls the advance 14.

The products may also be placed in packagings by the portioning belt 3, in addition to being conveyed onwards. The portioning belt 3 is then simultaneously a loading belt as well. For this application it is advantageous if the end 15 of the portioning belt is likewise displaceably mounted on the frame (not shown) of the portioning belt 3. The portions 6 can then be placed in the packagings by a fast return of the end 15 when the belt is stationary. Loading of the portions 6 in packagings is likewise controlled by the above-mentioned controller. The loading of products in packagings will be discussed in more detail in the descriptions of FIG. 10.

A person skilled the art understands that the portions 6 are not just one product but a plurality of products which have been configured to form a portion. This portion may have been transferred to the aligning belt in a finished state and/or may be produced by the movement of the transfer edge. Possible portions are shown in FIG. 11 to 19.

At the beginning of the aligning belt 1, the device according to the invention comprises a a detection means 21 (e.g., a photocell), which detects at least the position of the products 2 on the aligning belt in the conveying direction. The further path and speed of the respective products 2 on the respective portions 6 on the aligning and portioning belts is then calculated exactly, so that at any time the device according to the invention knows exactly where the respective product is located and at what speed it is moving.

As can also be seen in FIG. 1, a division of a single-row product stream into a multi-column (six column) product stream is possible as a result of the movement of the transfer edge.

Figure 2:
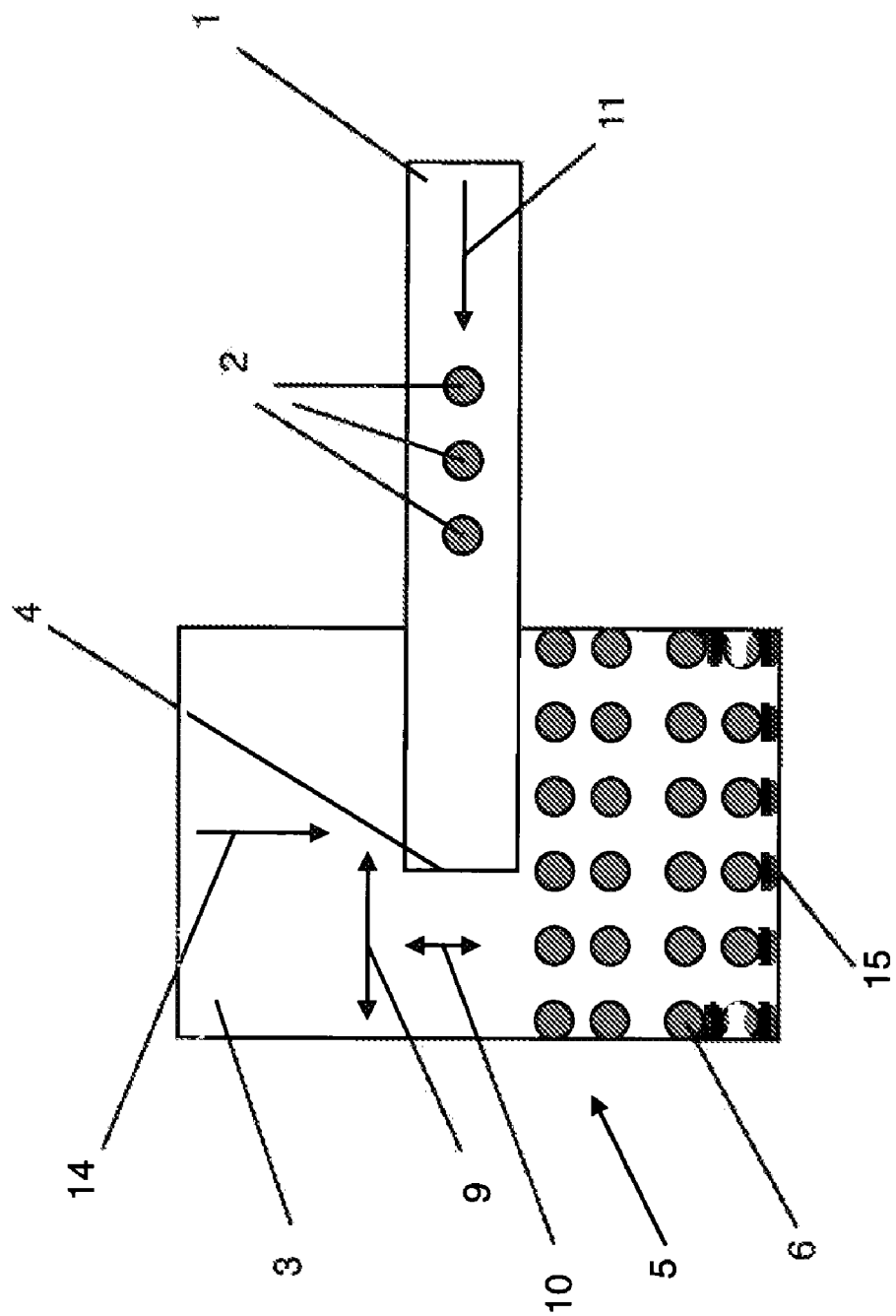
FIG. 2 shows an embodiment of the device according to the invention in which the portioning belt is moved in two directions.

The embodiment of the device according to the invention in FIG. 2 corresponds substantially to the embodiment of the device according to FIG. 1 except that in FIG. 2 the portioning belt is moved in two directions. These statements regarding FIG. 1 therefore apply analogously. The portioning belt 3 is configured as an endless belt which is guided in a machine frame (not shown). The movement of the portioning belt relative to the transfer edge and in the direction 10 takes place via a reciprocal movement of the endless belt relative to the machine frame. The movement of the portioning belt relative to the transfer edge and in the direction 9 takes place via a displacement of the entire machine frame. The movements of the portioning belt 3 relative to the transfer edge 4 take place using two servomotors (not shown).

Figure 3:
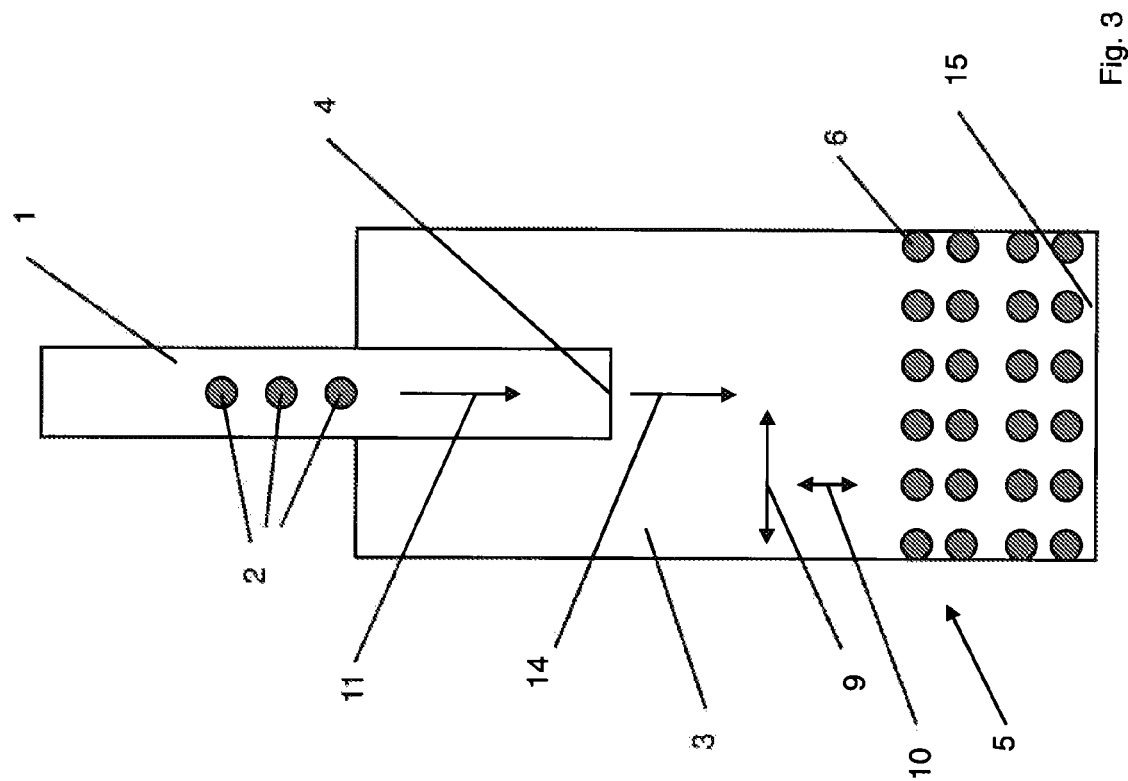
FIG. 3 shows a further embodiment of the device according to the invention in which the portioning belt is moved in two directions.

FIG. 3 shows a further embodiment of the device according to the invention in which the portioning belt is moved in two directions. This embodiment of the present invention substantially corresponds to the embodiment of FIG. 2 except that in the present example the aligning belt 1 is arranged parallel to the portioning belt 3. The statements regarding FIGS. 1 and 2 therefore apply analogously.

Figure 4:
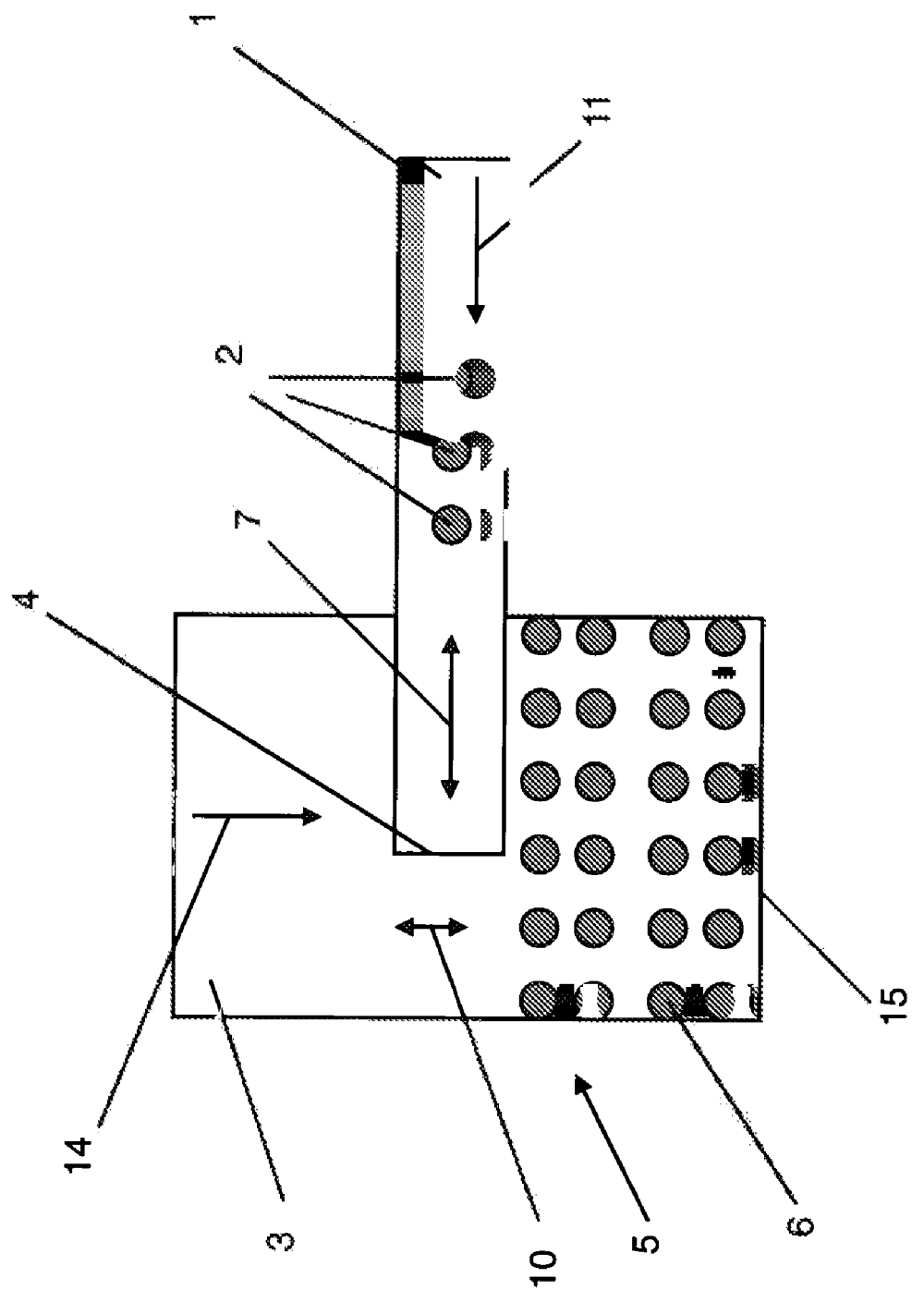
FIG. 4 shows an embodiment of the device according to the invention in which the transfer edge of the aligning belt is moved in the conveying direction and the portioning belt transversely thereto.

FIG. 4 shows an embodiment of the device according to the invention in which the transfer edge of the aligning belt is moved in and/or counter to the conveying direction thereof and the portioning belt is moved transversely thereto. In this embodiment the movements in and transversely to the conveying direction of the aligning belt are accordingly divided between the two units. The movement of the transfer edge 4 preferably takes place in that the transfer edge 4 is pivotally mounted on the machine frame (not shown) of the aligning belt 1 and is pushed back and forth within the guide by a servomotor. The portioning belt is preferably constructed as an endless belt which is guided in a machine frame and driven by a servomotor. The movement of the portioning belt 3 is preferably achieved by a forward and/or backward movement of the endless belt. This embodiment has the advantage that any desired portion patterns 6 and format configurations 5 can be deposited on the portioning belt 3 without the aligning belt of the portioning belt in its entirety having to be moved. Furthermore, the statements regarding FIG. 1 to 3 apply analogously.

Figure 5:
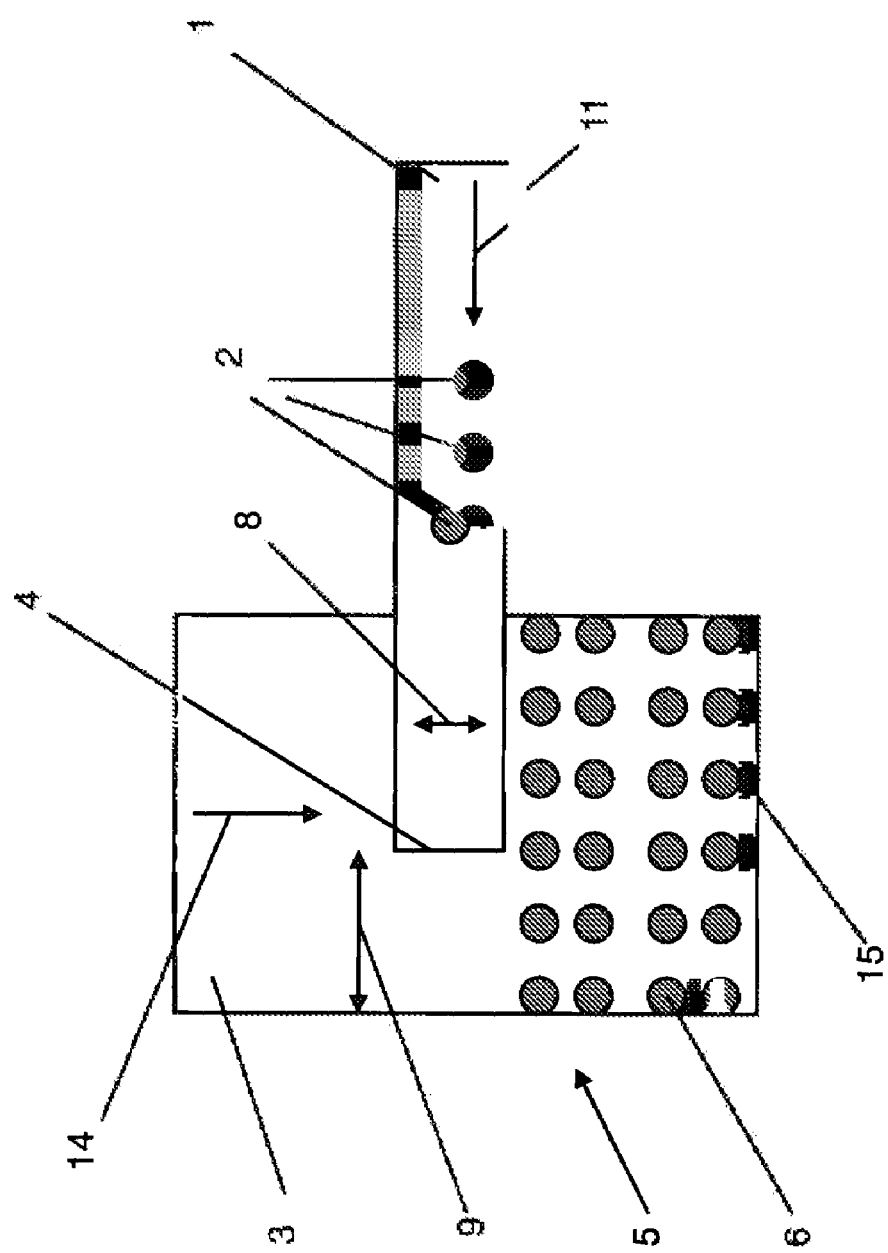
FIG. 5 shows an embodiment of the device according to the invention in which the aligning belt is moved transversely to the conveying direction and the portioning belt in the conveying direction of the aligning belt.

FIG. 5 shows an embodiment of the device according to the invention in which the transfer edge of the aligning belt is moved transversely to the conveying direction and the portioning belt is moved in and/or counter to the conveying direction of the aligning belt. Accordingly, the movements in and transversely to the conveying direction of the aligning belt are also divided between the two units in this embodiment. Furthermore, the statements regarding FIG. 1 to 4 apply analogously.

Figure 6:
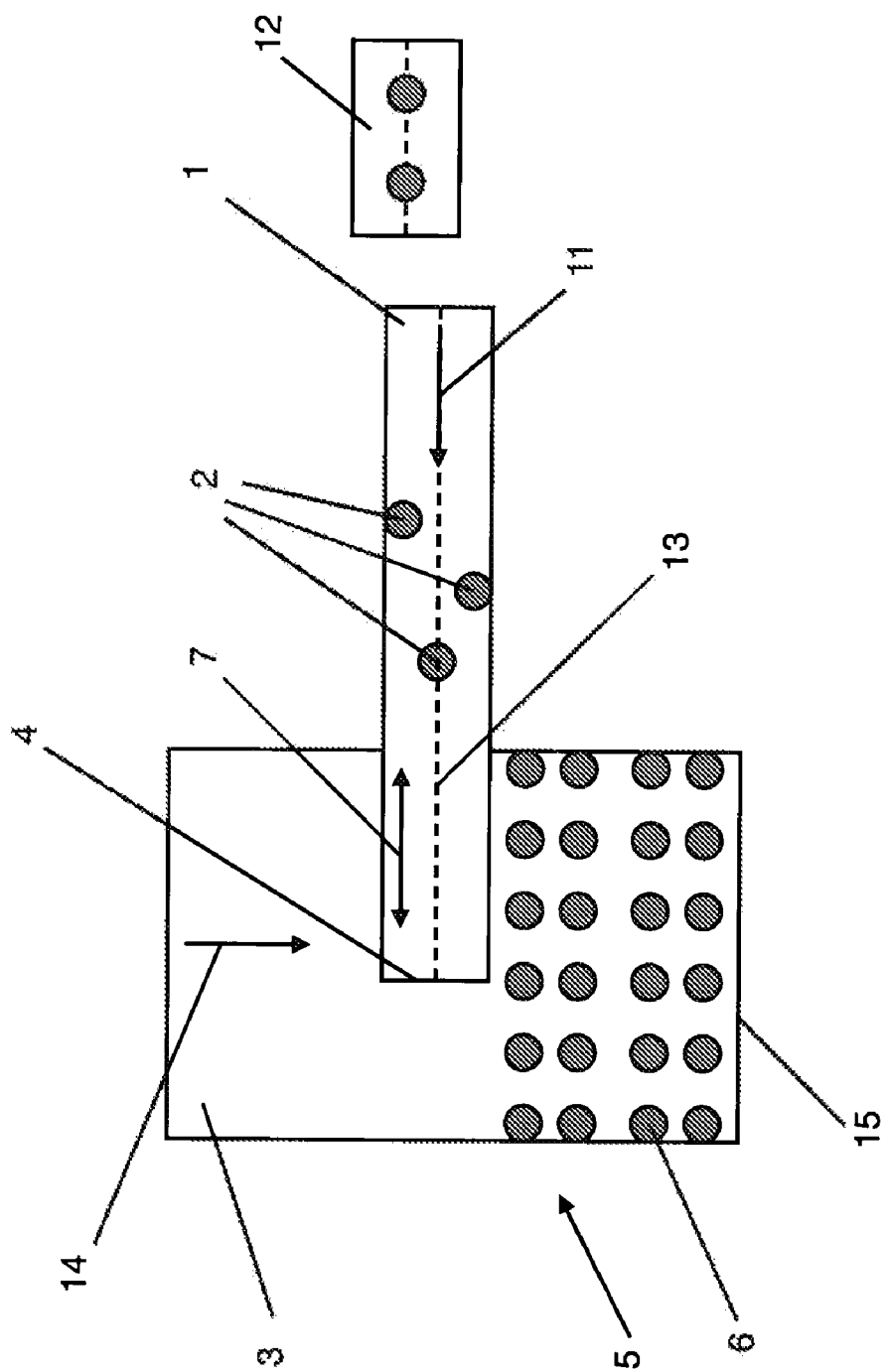
FIG. 6 shows an embodiment of the device according to the invention comprising a means with which the products can be lined up relative to the central track on the aligning belt.

FIG. 6 shows an embodiment of the device according to the invention, comprising a means 12 with which the products can be lined up on the aligning belt 1 relative to the central track 13. The products 2 are distributed on the aligning belt 1 relative to the central track 13 in such way that the desired portion patterns 6 or format configurations 5 take place only owing to a movement of the transfer edge 4 of the aligning belt relative to the portioning belt and/or of the portioning belt 3 relative to the transfer edge 4. For example, a circle can be deposited on the portioning belt if the products 2 are sinusoidally arranged on the aligning belt. Furthermore, the statements regarding FIG. 1 to 5 apply analogously.

Figure 7:
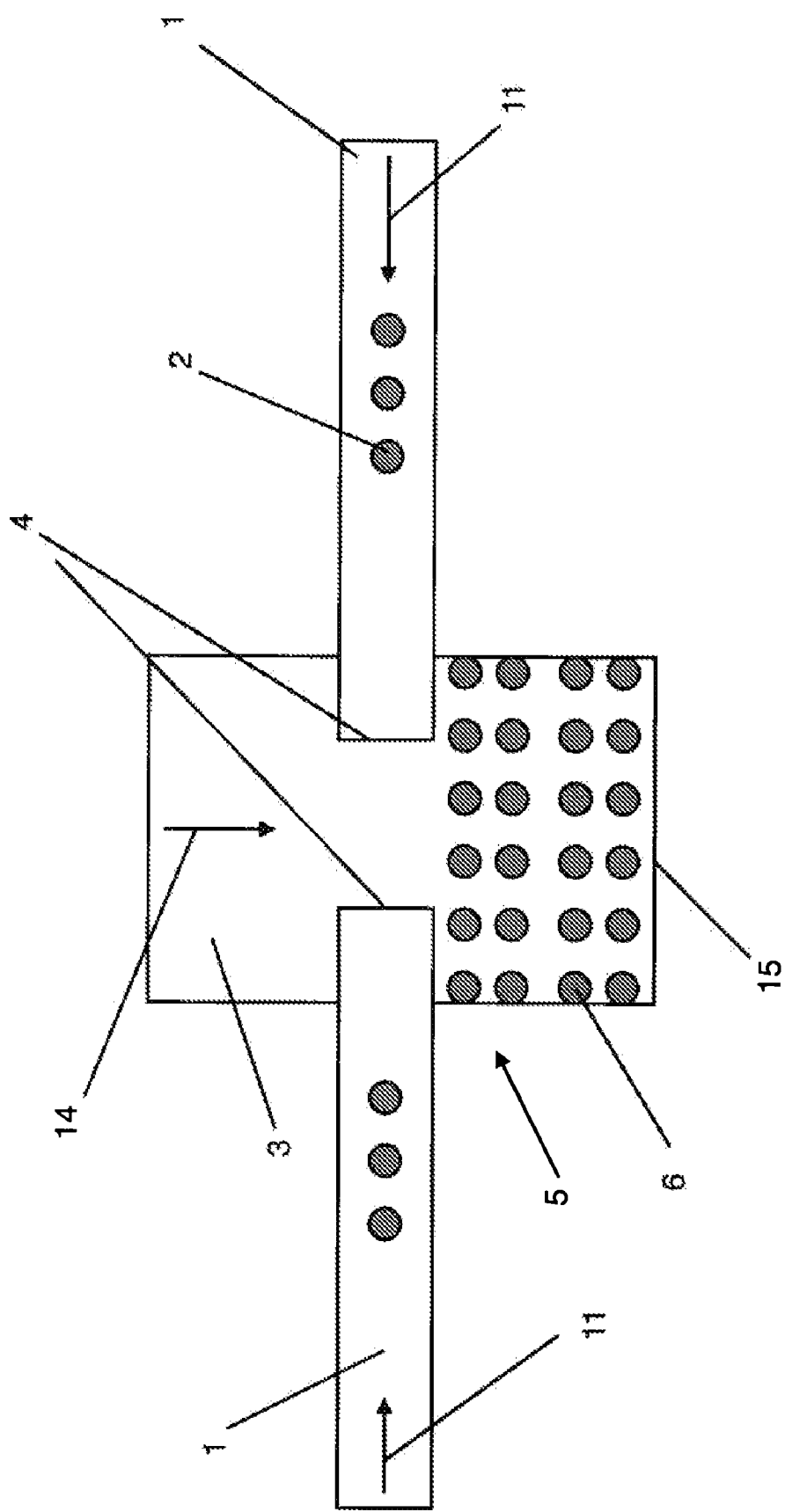
FIG. 7 shows an embodiment of the device according to the invention with two aligning belts.
Figure 8:
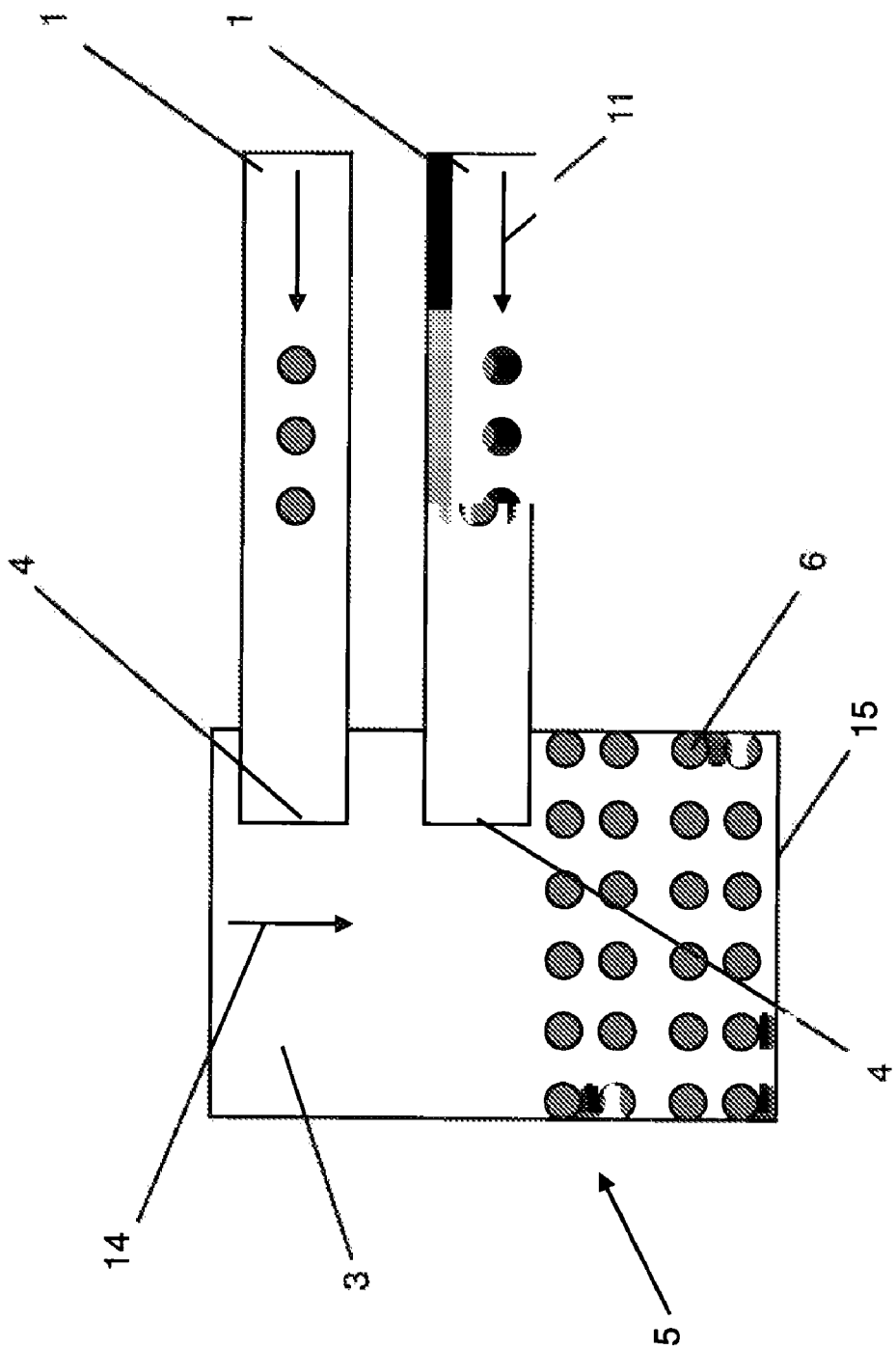
FIG. 8 shows a further embodiment of the device according to the invention with two aligning belts.

FIGS. 7 and 8 show an embodiment of the device according to the invention comprising two aligning belts 1 which in the present case are configured as endless belts which are guided in the machine frame. The endless belts are each driven by a servomotor. The transfer edge 4 is in each case displaceably arranged on the machine frame in a guide (not shown), the displacement of the transfer edge likewise taking place via a servomotor. The two aligning belts can be operated completely independently of one another. This applies to the drives of the endless belts and to the displacement of the transfer edge. This embodiment of the present invention is advantageous if a plurality of product rows has to be made available for supply into a deposit system or into a loading station. Reference is made, moreover, to the statements regarding FIG. 1.

Figure 9:
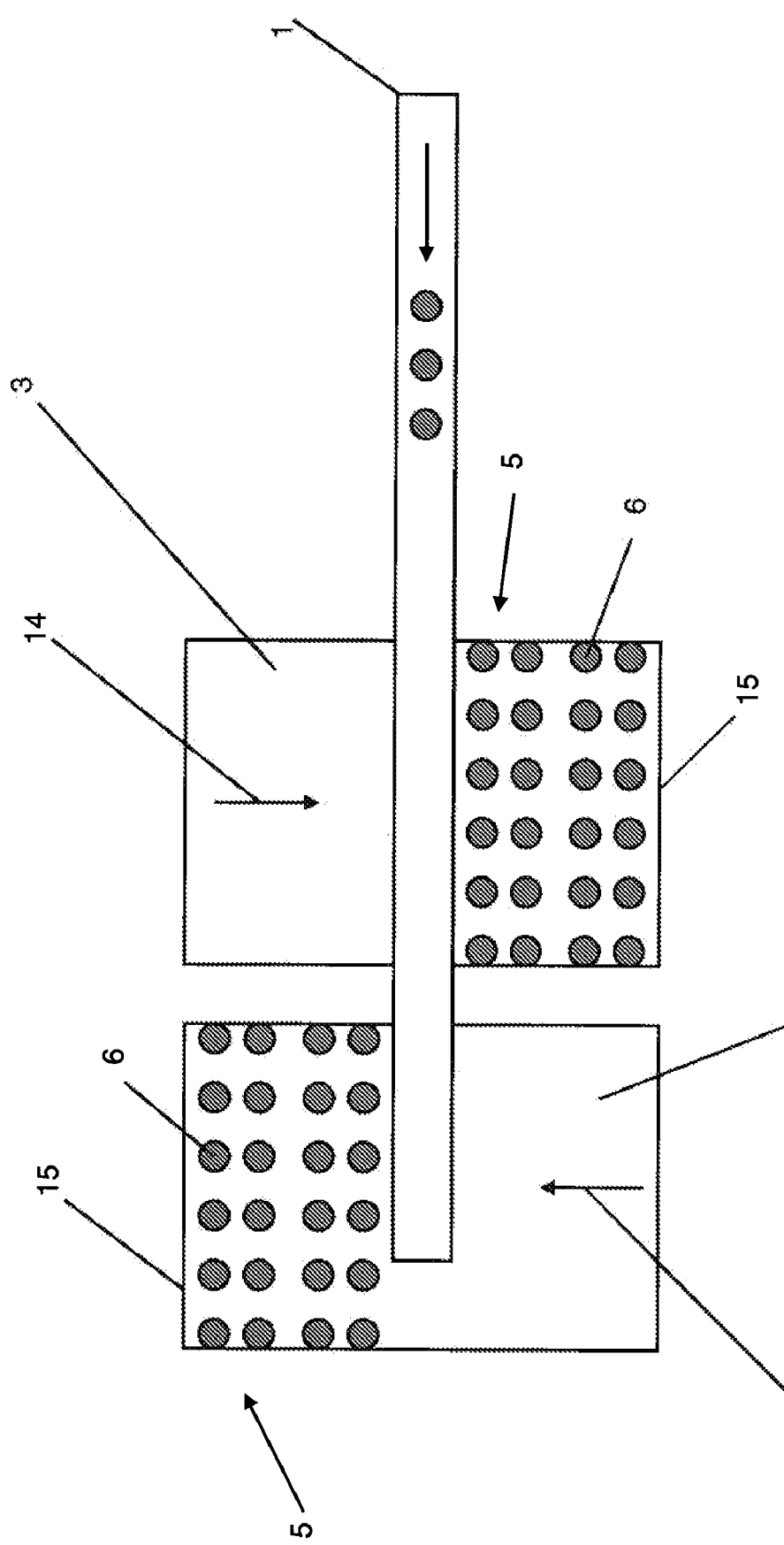
FIG. 9 shows an embodiment of the device according to the invention with two portioning belts.

FIG. 9 shows a further embodiment of the device according to the invention with two portioning belts 3. This solution is of particular interest when, for example, two packaging machines are to be supplied with the same products, wherein the portion configurations 6 and the formats 5 can be different in each case.

FIG. 10 shows a system according to the invention comprising a device according to invention and a packaging machine operating in a clocked manner, of which only the loading station 16 is shown. During one clock, nine packaging cavities 18 are filled with product in the loading station 16 and then conveyed onwards by one clock. The device according to the invention comprises an aligning belt 1 and a portioning belt 3 arranged at a right angle thereto. The aligning belt 1 is a single-strip endless belt, of which the end 4 is again configured so as to be movable in the above-described manner. The portioning belt 3 is likewise configured as an endless belt. The belt end 15 is also configured as a movable belt end in the sense of a return/shuttle belt. Reference numeral 11 designates the conveying direction of the products 2 on the aligning belt 1, reference numeral 14 the conveying direction of the portions 6 on the portioning belt and 17 the conveying direction of the portions 6 into the packaging cavities 18. The packaging cavities 18 are illustrated only schematically in the loading station 16. The reciprocating movement of the transfer edge 4 is symbolized by the double arrow 7 and the movement of the portioning belt 3 relative to the transfer edge 4 by the arrow 10. The double arrow 19 denotes the reciprocating movement of the transfer edge 15. In this embodiment, the products 2 pass from the aligning belt 1 onto the portioning belt configured as a loading belt, wherein, due to the movable construction of the transfer edge 4, they can be deposited, for example in a different sequence, one above the other as a stack or shingled as portions 6 in the formats 5. In the present case, a format 5 consists of three rows and three columns, the number of rows corresponding to the number of adjacent packaging cavities 18 transverse to the conveying direction 17 and the number of columns corresponding to the advance of the packaging cavities during one clock. The portioning belt 3 then conveys these portions to the loading station 16. The portions 6 are deposited or ejected by the portioning belt 3 into the free packaging cavities in the loading station 16. This may also be varied in this example as the belt end 15 is likewise configured so as to be movable. A person skilled in the art acknowledges that the portioning belt 3 may also be divided into multiple strips. In this case it is possible to configure the belt ends thereof independently of one another and likewise movably as a return/shuttle belt. Both belts have belt compensation 20.

It will again be described with reference to this example how the products are positioned. The device according to the invention consists of an aligning belt 1 and a portioning belt 3. In this case, the aligning belt 1 is parallel to the packaging machine with the loading station 16, and the portioning belt 3 transverse to the aligning belt 1 and to the loading station 16 of the packaging machine. The aligning belt 1 conveys the row of incoming products or portions to the portioning belt 3. This in turn then conveys the products 2 as portions 6 arranged in a specific format 5 to the loading station 16 of the packaging machine. In principle, the two belts 1, 3, as endless belts, are identical. They differ in the selected example only in their width. A servomotor 24, 25 (FIG. 1) for driving the aligning belt and the conveying belt, respectively, and a servomotor 25, 26 (FIG. 10) for driving the movement of the transfer edge 4 of the aligning belt 1 and the belt end 15 of the portioning belt 3, respectively. As a result of this arrangement the transfer edge 4 and the belt end 15 can be moved back and forth. As already mentioned this embodiment is also called a shuttle belt.

Reference numeral 20 indicates a length-compensating device which allows fast compensation or provision of conveyor belt in the event of a change in the active length thereof. The products 2 arriving in a row are ejected from the aligning belt 1 onto the portioning belt 3 at constant belt speed defined by the controller of the belt return. There may be one, two, three or more ejection points, depending on the format configuration of the packaging machine (in the conveying direction of the packaging cavities 18), there being three in the present case. A fast return stroke of the transfer edge 4 while reaching the ejection position causes a reduction in the tilting effect during the parabolic trajectory.

The portioning belt 3 clocks onward by a calculated amount when a row of products 2 has been transferred to the portioning belt by the aligning belt 1. This means that the belt of the second conveyor belt 3 advances in steps. This onwards clock rate then produces the required format configuration transversely to the conveying direction of the packaging machine. As soon as a format has been completely deposited the portioning belt clocks onward by another calculated amount and a new format is deposited. In the present example two formats are completely deposited on the portioning belt. In a third format the first row has just been deposited. If the products are in the position for transfer to the packaging machine, in other words are exactly above the open packagings in the loading region of the loading station 16 of the packaging machine, a fast return stroke takes place when the belt is stationary, whereby the portions fall vertically downwards. In the meantime, a new row of products 2 is transferred via the aligning belt 1 to the portioning belt 3. Before the next belt advance occurs the second portioning belt 3 or the belt end 15 returns to the starting position until, after further forward clocks, portions are again in the ejection position.

The above-described packaging line has the following properties and advantages. In the selected embodiment both belts are configured as a return/shuttle belt. The two conveyor belts are at right angles to one another. By using a central controller and servodrives for the belts and for the belt ends 4, 15, the format configuration can be stored in the programmed, in other words a change in the format distribution only requires a changeover to a different programmed without any components of the packaging line having to the change their position. By using servodrives and a detection means at the beginning of the aligning belt 1, it is possible to precisely calculate the path and speed of a product 2 or portion 6 and to store the data in the controller. The device according to the invention accordingly knows at any time where the respective product 2 or the respective portion 6 is located and what speed it has at that instant. This information is particularly important for restarting the device according to the invention after an operation-induced stoppage, as the device according to the invention can be automatically restarted. Products which are located on the device according to the invention after the stoppage do not have to be removed. At least the position of the products 2 in the conveying direction 11 is ascertained by the detection means. If the detection means also detects offsetting of the products relative to the center line or any other longitudinal axis of the aligning belt, this information can be used to compensate the offset by a corresponding movement of the portioning belt, so the desired portion pattern or the desired format configuration is produced on the portioning belt.

The selected arrangement of the belts 1, 3 relative to one another, the use of servodrives and the coordination of the position of the transfer edge 4 relative to the portioning belt and the movement of the portioning belt 3 relative to the transfer edge 4 allows any desired portion patterns 6 and format configurations 5, which are shown as example in FIG. 11 to 19, to be created. The spacing between the products 2 on the aligning belt may vary.

FIG. 11 to 19 show portions and formats, which can be produced with the device according to the invention. The list is to be understood as being exemplary and non-limiting.

Figure 11:
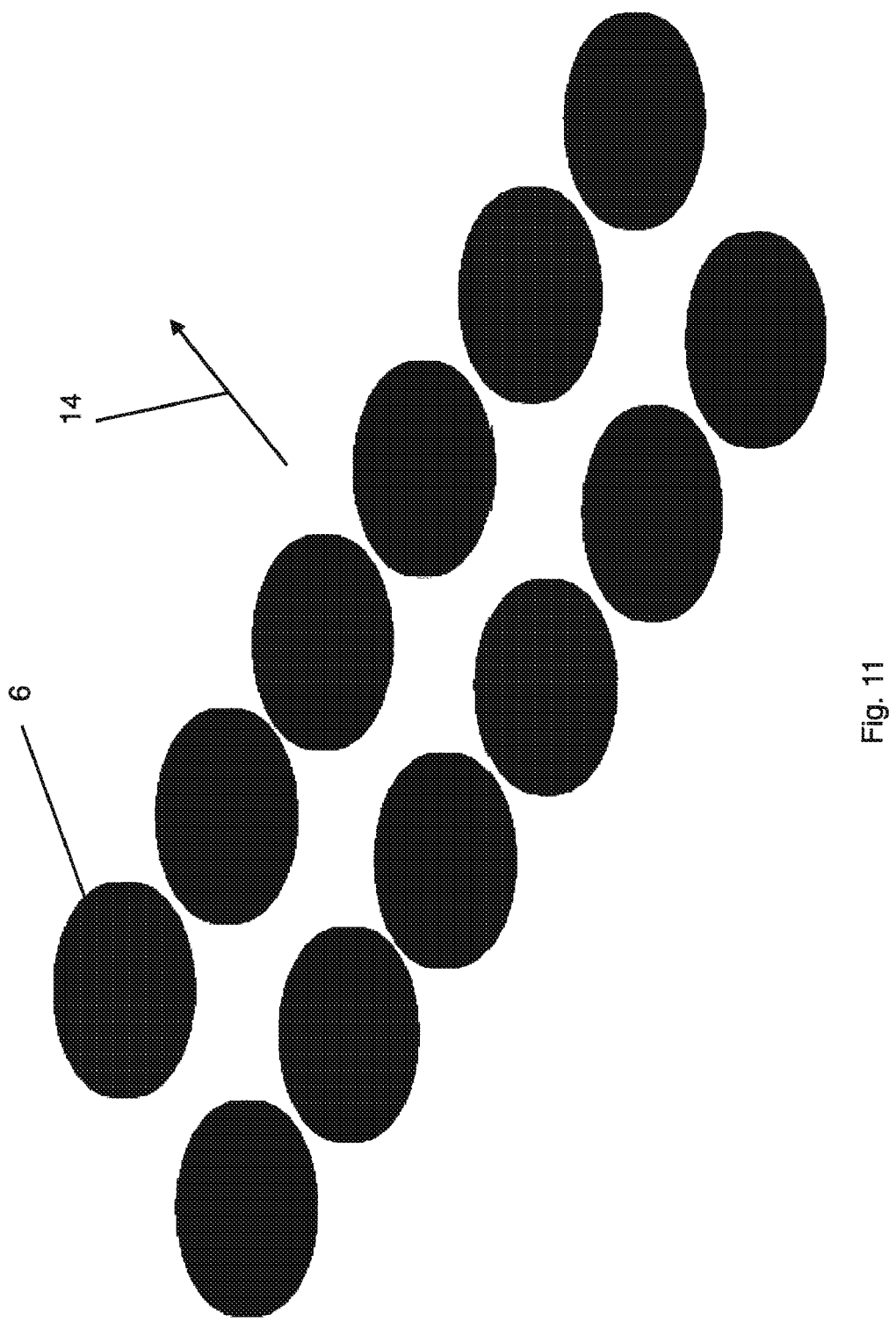
FIG. 11 shows products in a regular row.

FIG. 11 shows six portions 6 in regular row. Two rows are shown. The portions 6 are conveyed on the portioning belt (not shown) in the direction shown by the arrow 14. The format can be of single-row or double-row configuration, in other words either one or two rows are deposited in the loading station of a packaging machine during one clock.

Figure 12:
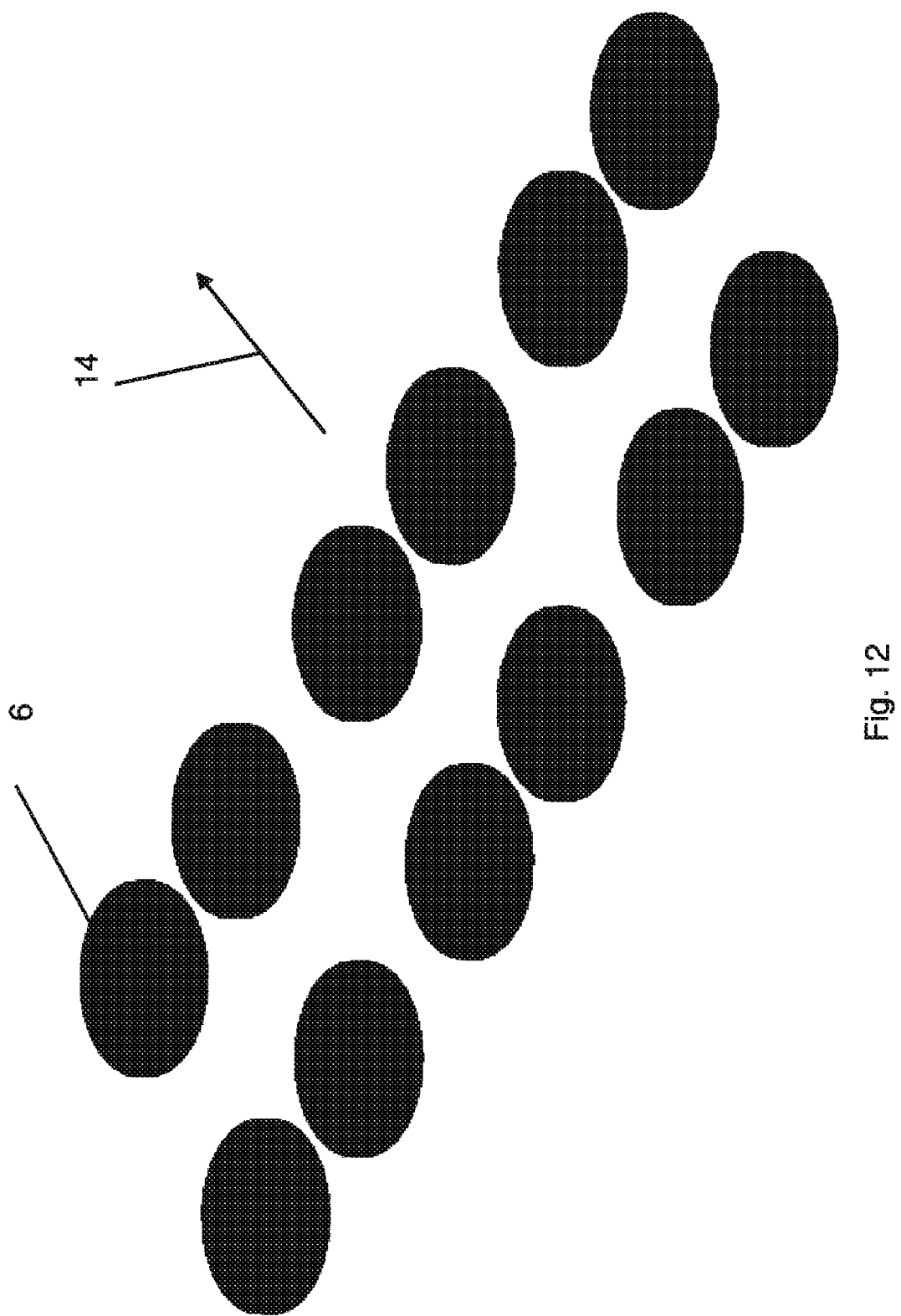
FIG. 12 shows products in an irregular row.

FIG. 12 shows three portions 6 in an irregular row. Two rows are shown. The portions 6 are conveyed on the portioning belt (not shown) in the direction shown by the arrow 14. The format can be of single-row or double-row configuration, in other words either one or two rows are deposited in the loading station of a packaging machine during one clock.

Figure 13:
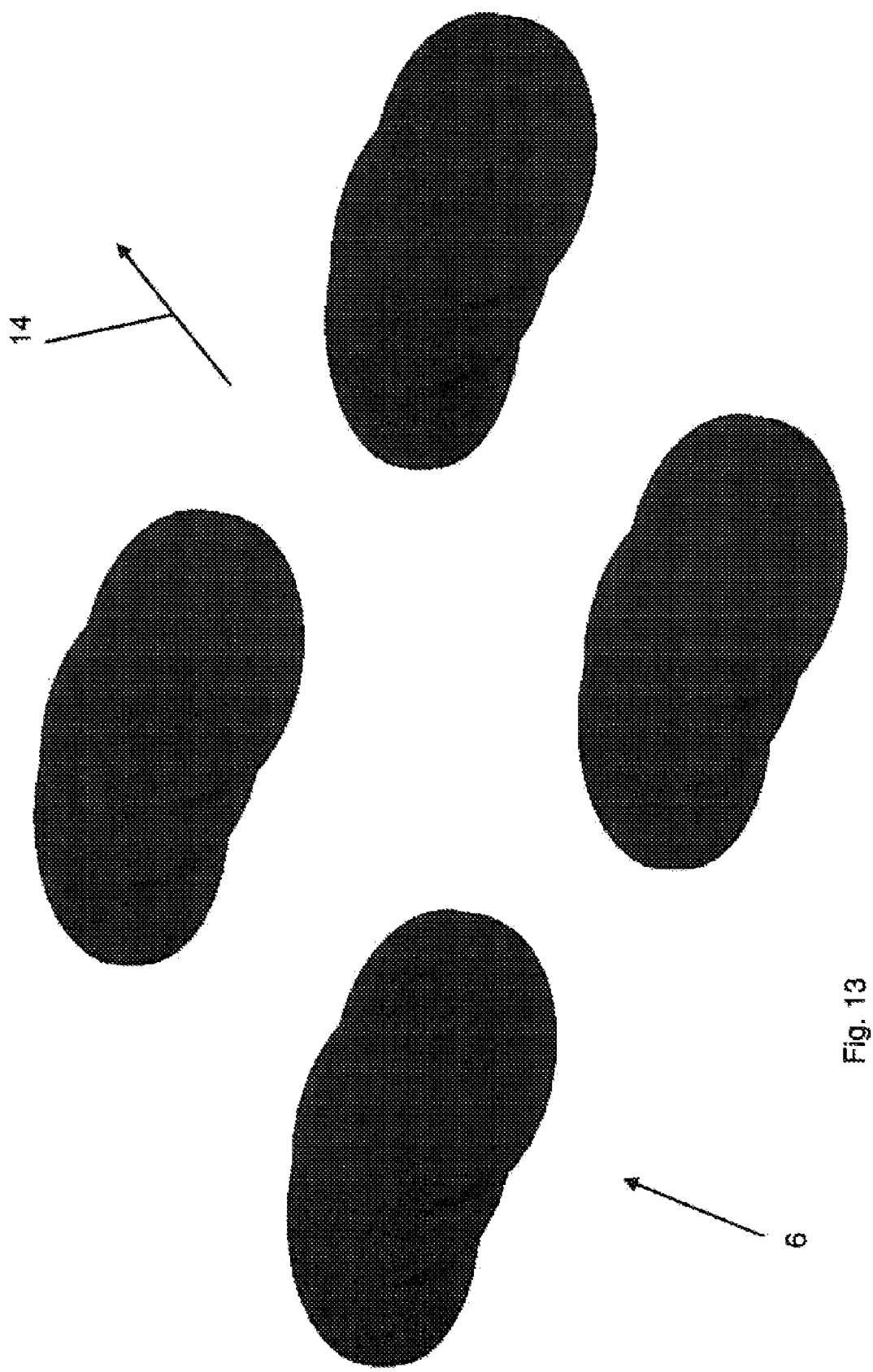
FIG. 13 shows products shingled to the front.

FIG. 13 shows two portions 6 shingled to the front in a row. A row is produced by the device shown in FIG. 10 in that the portion is constructed from left to right or, relative to the conveying direction of the aligning belt, from back to front. The portioning belt is stationary meanwhile. Two rows are shown. The portions 6 are conveyed on the portioning belt (not shown) in the direction shown by the arrow 14. The format can be of single-row or double-row configuration, in other words either one or two rows are deposited in the loading station of a packaging machine during one clock.

Figure 14:
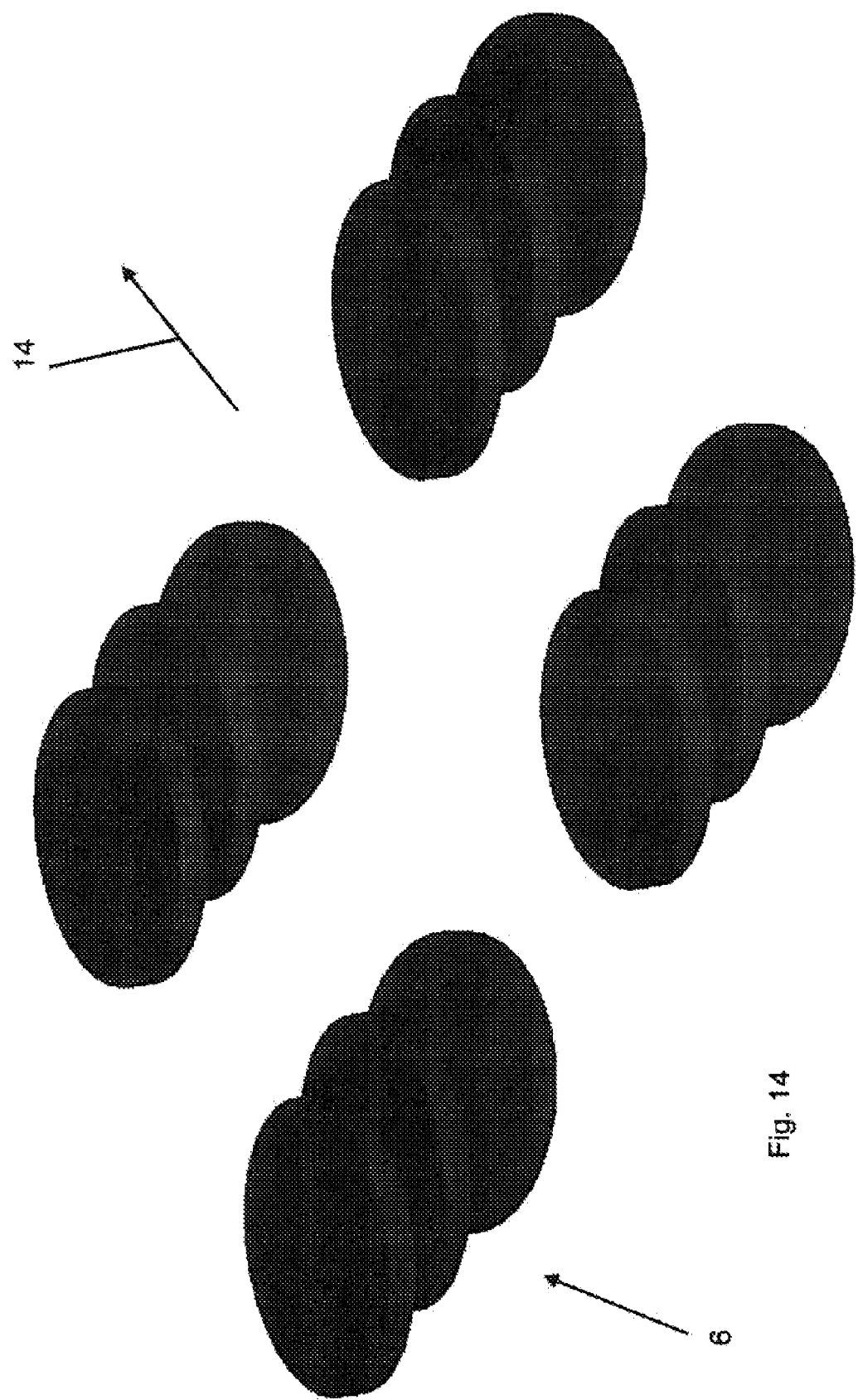
FIG. 14 shows products shingled to the back.

FIG. 14 shows two portions 6 shingled to the back in a row. A row is produced by the device shown in FIG. 10 in that the portion is constructed from right to left or, relative to the conveying direction 11 of the aligning belt, from front to back. The portioning belt is stationary meanwhile. Two rows are shown. The portions 6 are conveyed on the portioning belt (not shown) in the direction shown by the arrow 14. The format can be of single-row or double-row configuration, in other words either one or two rows are deposited in the loading station of a packaging machine during one clock.

Figure 15:
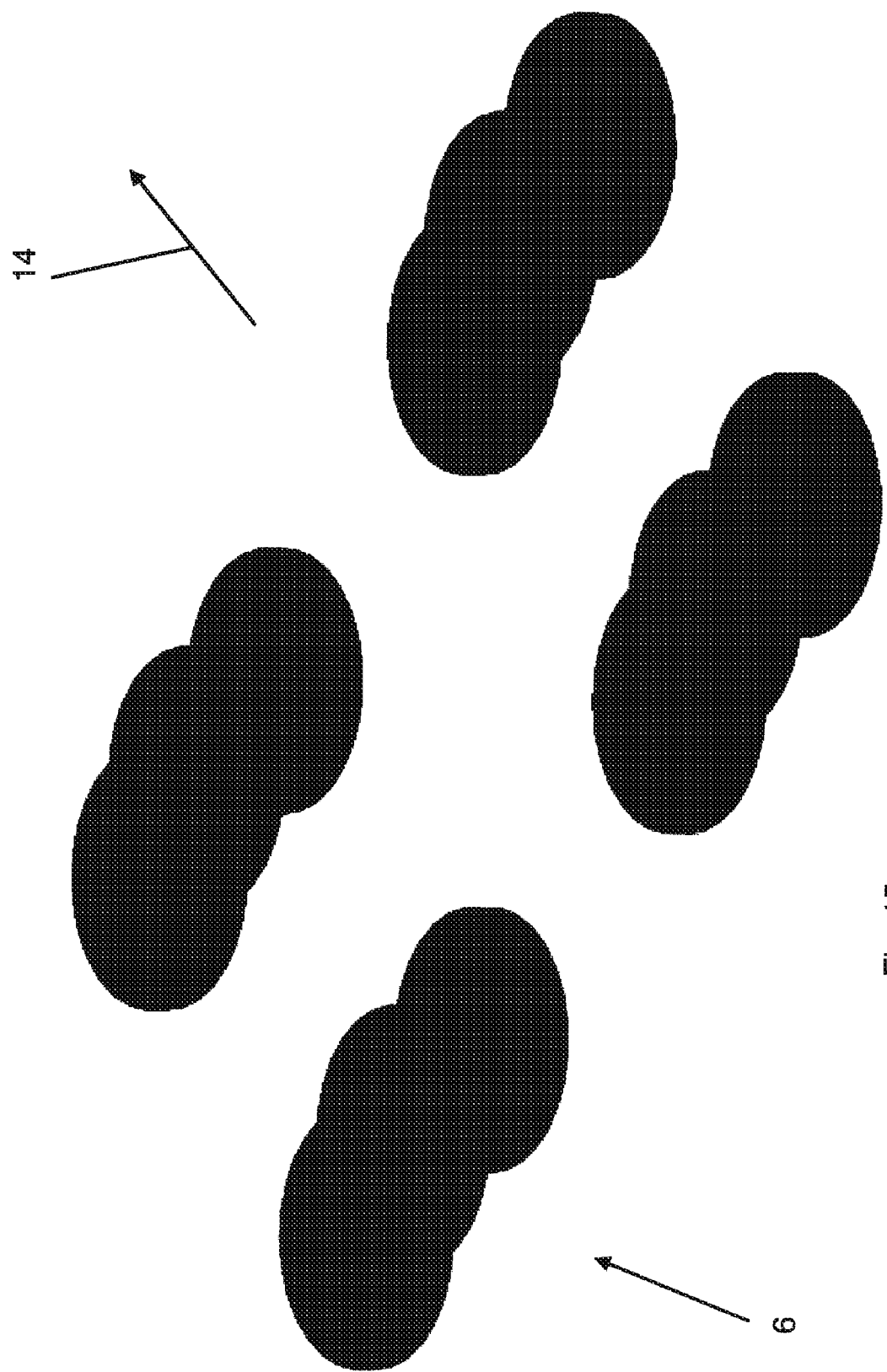
FIG. 15 shows terrace-like products.

FIG. 15 shows two terrace-like portions 6 in a row. A row is produced by the device shown in FIG. 10 in that first the two respective bottom products are deposited and then one respective product is placed on top. The portioning belt is stationary during deposition of a row. Two rows are shown. The portions 6 are conveyed on the portioning belt (not shown) in the direction shown by the arrow 14. The format can be of single-row or double-row configuration, in other words either one or two rows are deposited in the loading station of a packaging machine during one clock.

Figure 16:
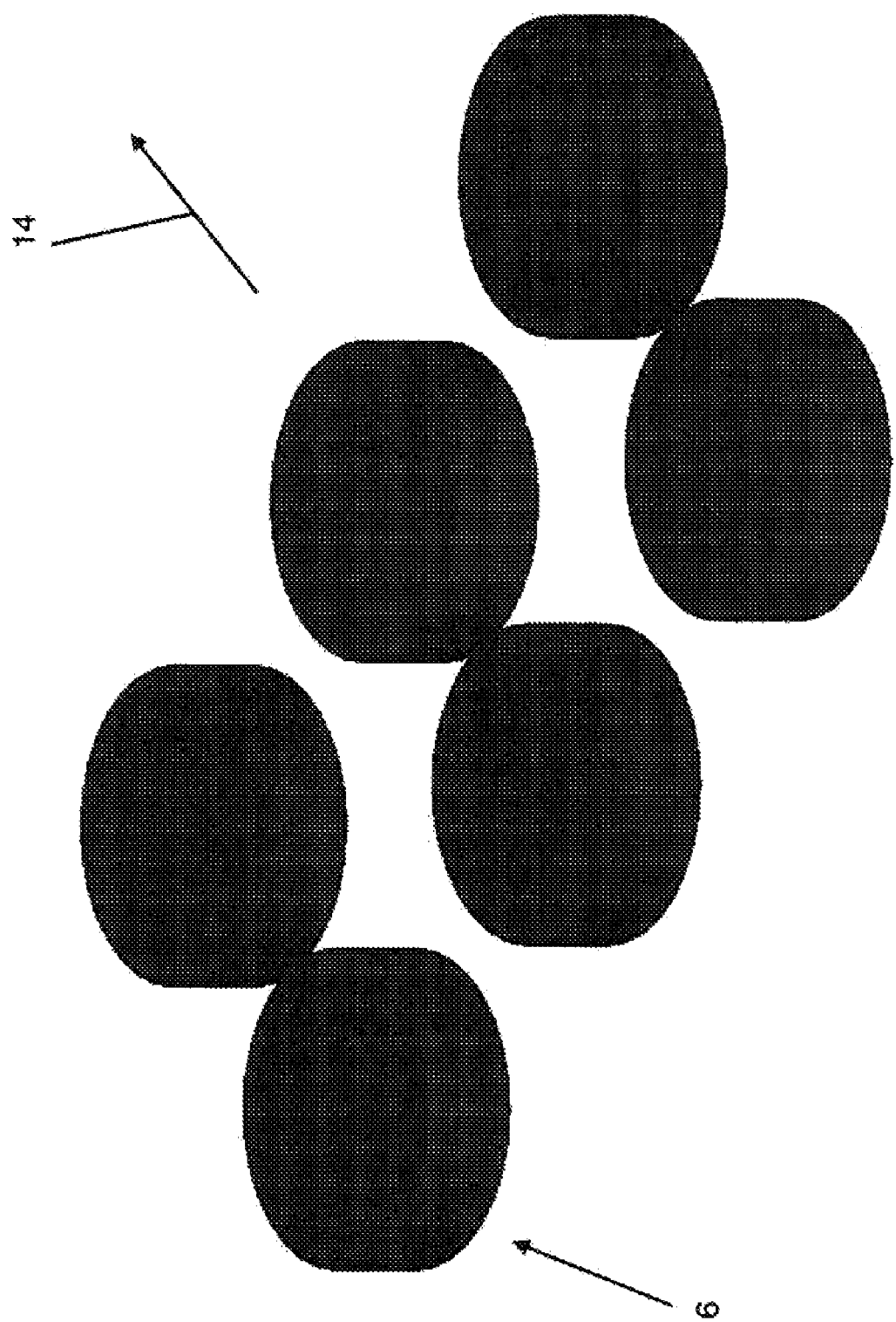
FIG. 16 shows stacked products

FIG. 16 shows three stacked portions in a row. A stack 6 is produced by the device shown in FIG. 10 in that three respective products 2 are deposited in one location on the portioning belt. The portioning belt is stationary during deposition of a row. Two rows are shown. The portions 6 are conveyed on the portioning belt (not shown) in the direction shown by the arrow 14. The format can be of single-row or double-row configuration, in other words either one or two rows are deposited in the loading station of a packaging machine during one clock.

Figure 17:
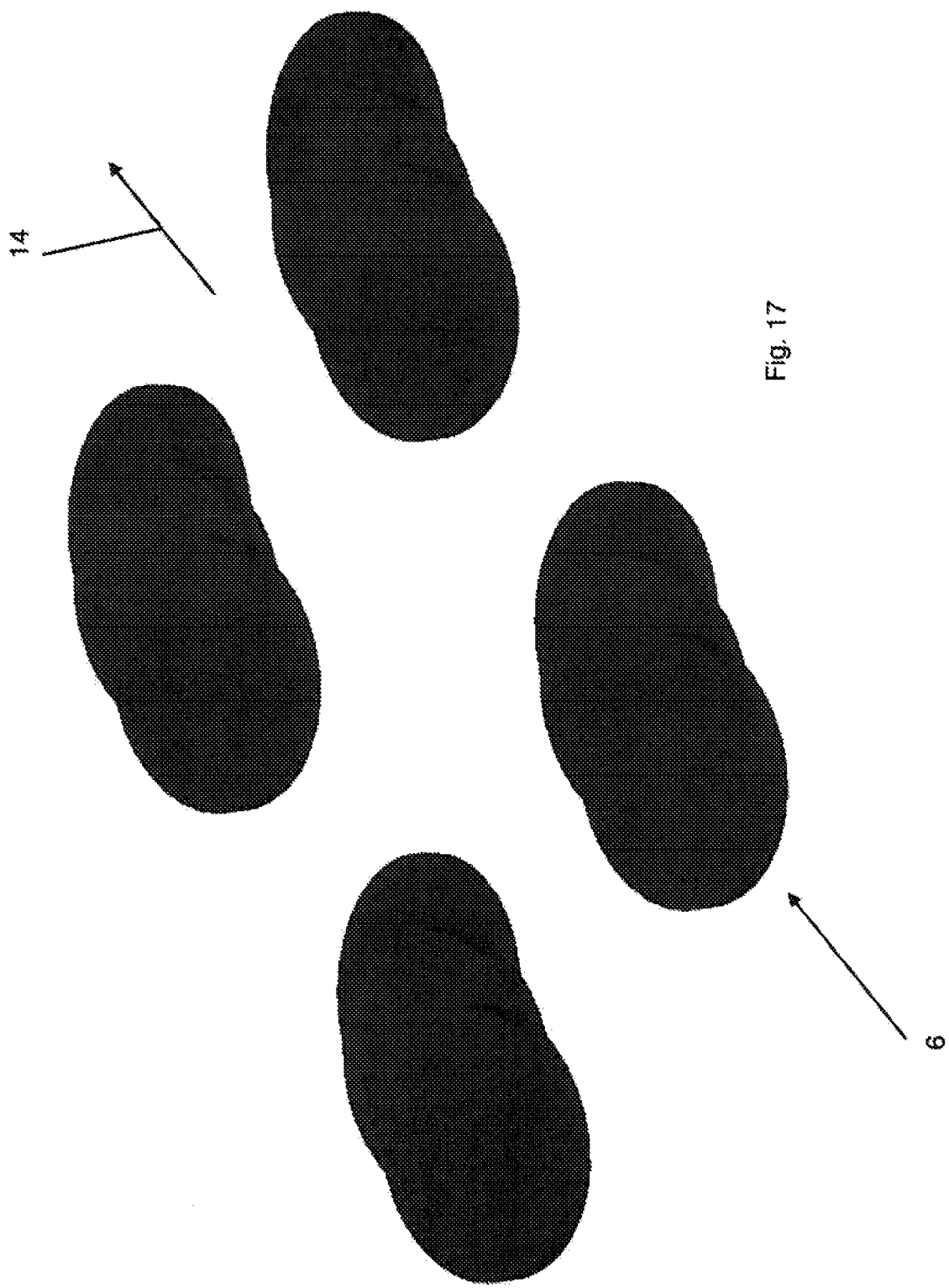
FIG. 17 shows transversely shingled products.

FIG. 17 shows two transversely shingled portions 6 in a row. A portion 6 is produced by the device shown in FIG. 10 in that three respective products 2 are deposited in one location on the portioning belt. The portioning belt conveys the product just deposited onward by one clock before the next product is deposited, the two portions 6 of a row, however, preferably being produced in parallel. Two rows are shown. The portions 6 are conveyed on the portioning belt (not shown) in the direction shown by the arrow 14. The format can be of single-row or double-row configuration, in other words either one or two rows are deposited in the loading station of a packaging machine during one clock.

Figure 18:
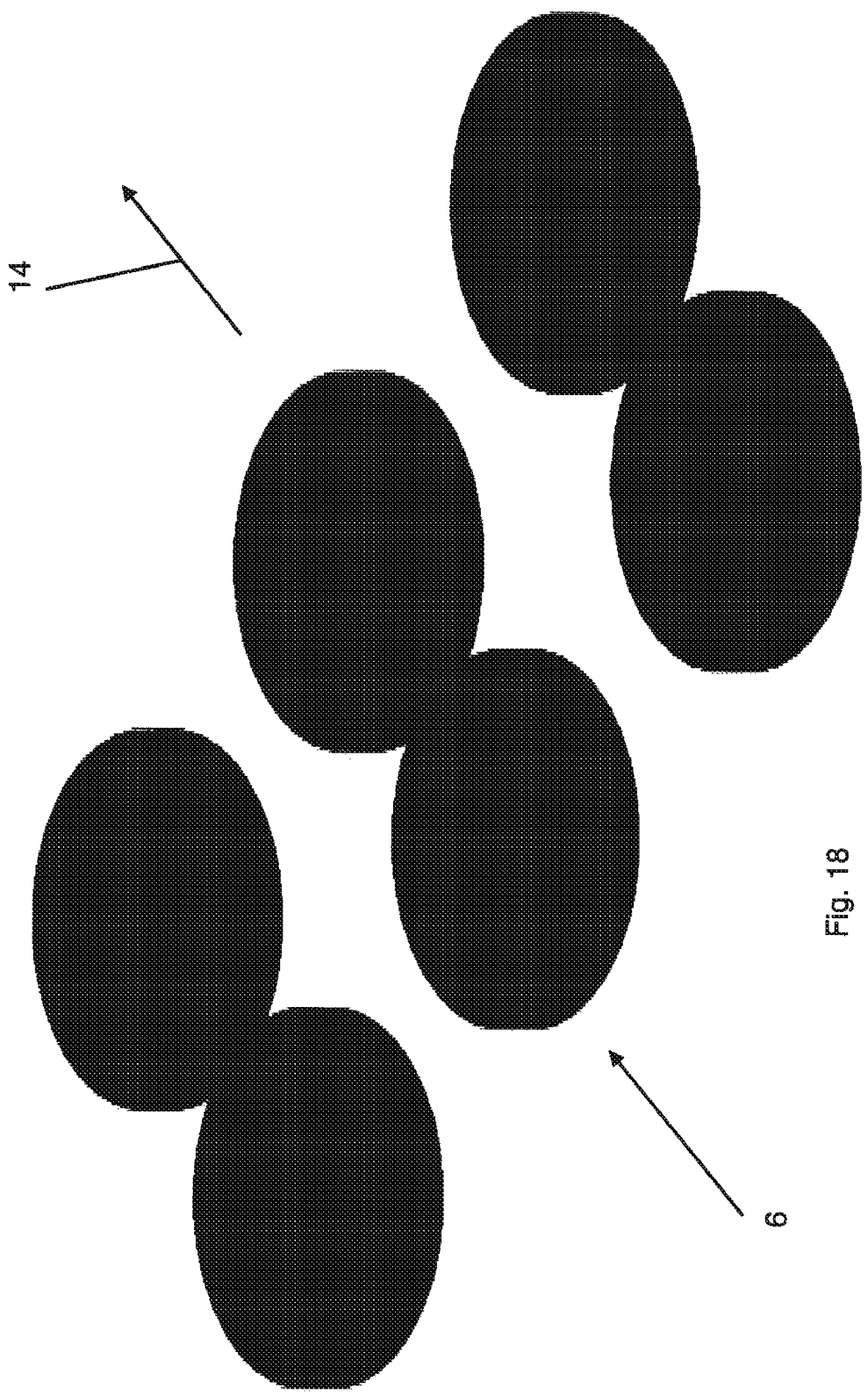
FIG. 18 shows shingled products without overlapping

FIG. 18 shows three transversely shingled portions 6, without overlapping, in a row. A portion 6 is produced by the device shown in FIG. 10 in that a product 2 is deposited on the portioning belt. The portioning belt conveys the product just deposited onward by one clock before the next product is deposited, the three portions 6 of a row, however, preferably being produced in parallel. One row is shown. The portions 6 are conveyed on the portioning belt (not shown) in the direction shown by the arrow 14.

Figure 19:
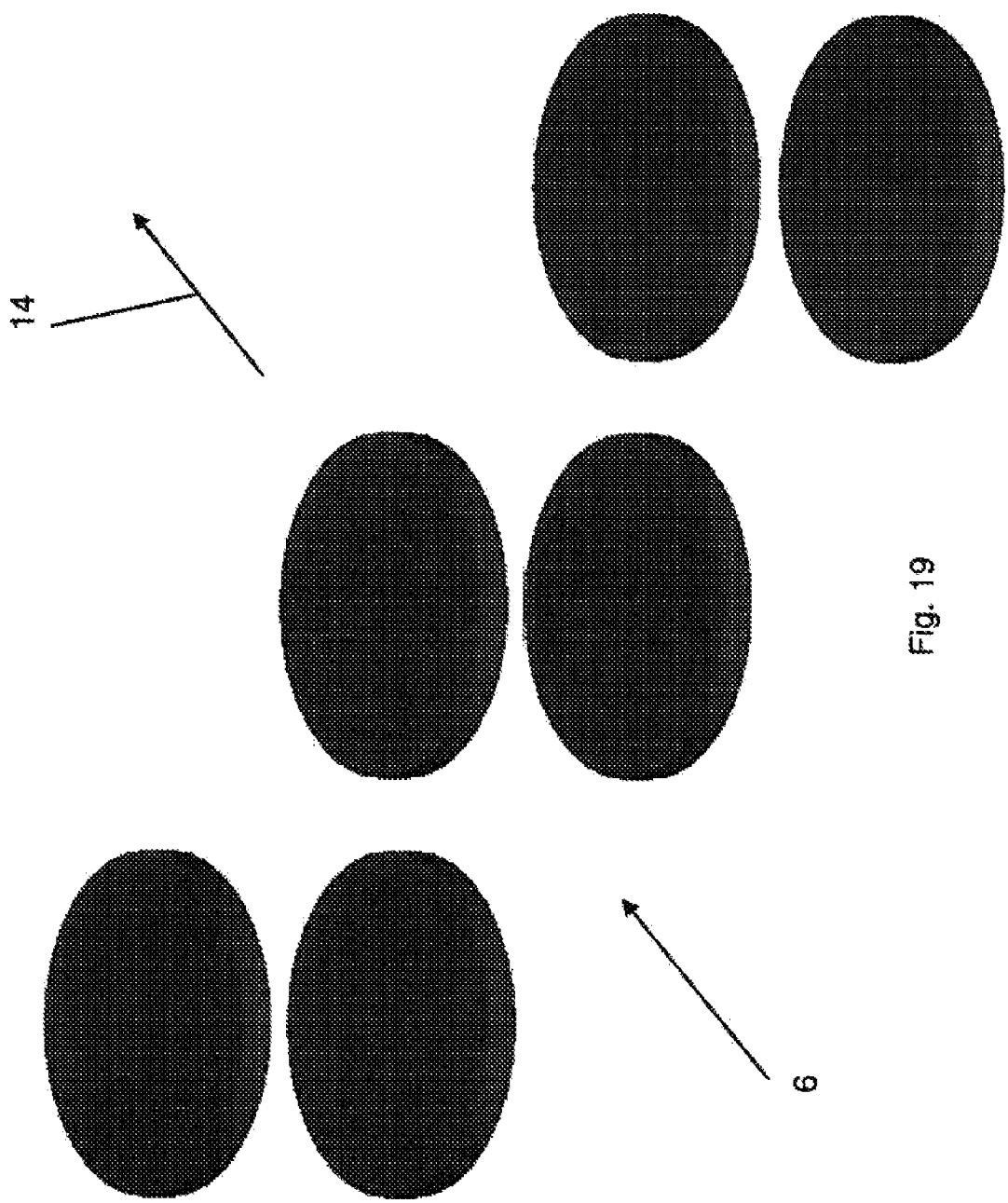
FIG. 19 shows products arranged offset.

FIG. 19 shows three offset portions 6, without overlapping, in a row. A portion 6 is produced by the device shown in FIG. 10 in that a product 2 is deposited on the portioning belt. The portioning belt conveys the product just deposited onward by one clock before the next product is deposited, the three portions 6 of a row, however, preferably being produced in parallel. One row is shown. The portions 6 are conveyed on the portioning belt (not shown) in the direction shown by the arrow 14.

The invention claimed is:

1. A device for producing various portions and formats of products comprising:
   (a) an aligning belt having a transfer edge, the aligning belt configured for conveying and transferring products to a portioning belt on which the portions and the formats are produced and with which the products are conveyed onwards as corresponding portions and in the respective format; and
   (b) a detection means, which detects and transfers first data on the position of a respective product on the aligning belt to a controller, the controller also receiving second data from at least one of an aligning belt drive and a portioning belt drive so that the location of the respective product can be calculated using the first and second data such that the controller controls at least one of the aligning belt drive and the portioning belt drive according to the desired portions and formats;
   wherein the position of the transfer edge is changed by an aligning belt drive relative to the portioning belt in at least one direction, the position of the portioning belt is changed by a portioning belt drive relative to the transfer edge in at least one direction, or both, the position of the transfer edge is changed by the aligning belt drive relative to the portioning belt in at least one direction and the position of the portioning belt is changed by the portioning belt drive relative to the transfer edge in at least one direction; and
   wherein the position of the transfer edge and the movement of the portioning belt are coordinated with one another such that one or more desired portions and formats are produced with the products.

2. The device of claim 1, wherein the position of the transfer edge is movable in a conveying direction of the aligning belt, counter to the conveying direction of the aligning belt, or both, and the portioning belt is movable relative to the transfer edge in a generally perpendicular direction to that of the conveying direction of the aligning belt.

3. The device of claim 2, further comprising a plurality of aligning belts, a plurality of portioning belts, or both.

4. The device of claim 3, wherein the conveying direction of the plurality of aligning belts, the conveying direction of the plurality of portioning belts, or both are the same or different.

5. The device of claim 2, wherein the transfer edge is displaceably mounted on the aligning belt and displacement of the transfer edge is achieved by way of a servomotor.

6. The device of claim 5, wherein the end of the portioning belt is displaceably mounted on the portioning belt and displacement the end is achieved by a servomotor.

7. The device of claim 2, wherein the aligning belt, the portioning belt, or both is driven by a servomotor.

8. The device of claim 7, wherein at least one selected portion pattern and at least one selected format is programmed and stored.

9. The device of claim 8, wherein the speed of the aligning belt is constant.

10. The device of claim 9, wherein the portioning belt is also a loading belt.

11. The device of claim 1, wherein the position of the transfer edge is movable in the conveying direction of the aligning belt and transversely to the conveying direction of the aligning belt.

12. The device of claim 1, wherein the portioning belt is movable in at least two directions that are generally perpendicular to one another.

13. The device of claim 1, further comprising a means with which the products are lined up on the aligning belt relative to a central track, and wherein the position of the transfer edge is movable in and counter to the conveying direction of the aligning belt.

14. A system comprising:
   (a) a device for producing various portions and formats of products including:
      (i) an aligning belt having a transfer edge, the aligning belt configured for conveying and transferring products to a portioning belt on which the portions and the formats are produced and with which the products are conveyed onwards as corresponding portions and in the respective format; and
      (ii) a detection means, which detects and transfers first data on the position of a respective product on the aligning belt to a controller, the controller also receiving second data from at least one of an aligning belt drive and a portioning belt drive so that the location of the respective product can be calculated using the first and second data such that the controller controls at least one of the aligning belt drive and the portioning belt drive according to the desired portions and formats;
      wherein the position of the transfer edge is changed by an aligning belt drive relative to the portioning belt in at least one direction, the position of a portioning belt is changed by the portioning belt drive relative to the transfer edge in at least one direction, or both, the position of the transfer edge is changed by the aligning belt drive relative to the portioning belt in at least one direction and the position of the portioning belt is changed by the portioning belt drive relative to the transfer edge in at least one direction; and
      wherein the position of the transfer edge and the movement of the portioning belt are co-ordinated with one another such that one or more desired portions and formats are produced with the products; and
   (b) a packaging machine;
   wherein the portioning belt is also a loading belt, which places the portions in one or more packaging cavities that are conveyed along the packaging machine in a clocked manner.

15. The system of claim 14, wherein the portioning belt is arranged at a right angle to the packaging machine.

16. The system of claim 15, wherein the aligning belt is arranged at a right angle to the portioning belt.

17. The system of claim 16, wherein the device is coordinated with the clocked manner of the packaging machine.

18. A method for producing one or more desired portions and formats of products comprising the steps of:
   (a) conveying products along an aligning belt having a transfer edge;
   (b) transferring the products at the transfer edge of the aligning belt to a portioning belt on which the portions and the formats are produced and with which the products are conveyed onwards as corresponding portions and in the respective format; and
   (c) placing the products in one or more packages in a clocked manner by the positioning belt;

wherein the position of the transfer edge is changed by an aligning belt drive relative to the portioning belt in at least one direction, the position of a portioning belt is changed by the portioning belt drive relative to the transfer edge in at least one direction, or both, the position of the transfer edge is changed by the aligning belt drive relative to the portioning belt in at least one direction and the position of the portioning belt is changed by the portioning belt drive relative to the transfer edge in at least one direction; and wherein the position of the transfer edge and the movement of the portioning belt are coordinated with one another such that the one or more desired portions and formats are produced with the products.

19. The method of claim 18, wherein the position of the transfer edge is movable in a conveying direction of the aligning belt, counter to the conveying direction of the aligning belt, or both, and the portioning belt is movable relative to the transfer edge in a generally perpendicular direction to that of the conveying direction of the aligning belt.

20. The method of claim 18, wherein the position of the transfer edge is movable in the conveying direction of the aligning belt and transversely to the conveying direction of the aligning belt.

21. The method of claim 18, wherein the portioning belt is movable in at least two directions that are generally perpendicular to one another.

22. The method of claim 18, wherein the position of the transfer edge is movable in the conveying direction of the aligning belt, and the products on the aligning belt are each positioned in a specific position relative to a central track on the aligning belt.

23. The method of claim 22, wherein the transfer edge is displaced relative to the aligning belt by way of a servomotor.

24. The method of claims 23, further comprising the step of detecting a position of one or more products on the aligning belt in at least one conveying direction of the aligning belt.

25. The method of claim 24, further comprising the step of controlling the device by a controller, which stores at least one amount for a clocking of the portioning belt.

26. The method of claim 25, wherein the clocking of the portioning belt includes the controller transmitting a signal to a drive of the portioning belt when at least one row of the format is complete.

27. The method of claim 26, wherein the speed of the aligning belt is constant.

28. The method of claim 18, further comprising the step of detecting and transferring first data on the position of a respective product on the aligning belt to a controller, the controller also receiving second data from at least one of the aligning belt drive and the portioning belt drive so that the location of the respective product can be calculated using the first and second data such that the controller controls at least one of the aligning belt drive and the portioning belt drive according to the desired portions and formats.

* * * * *